(12) United States Patent
Yoo et al.

(10) Patent No.: US 7,286,193 B2
(45) Date of Patent: Oct. 23, 2007

(54) LIQUID CRYSTAL DISPLAY UNIT HAVING A FIELD SEQUENTIAL DRIVEN BACKLIGHT UNIT

(75) Inventors: Jang Jin Yoo, Seoul (KR); Jong Hoon Woo, Kyonggi-do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 266 days.

(21) Appl. No.: 10/740,464

(22) Filed: Dec. 22, 2003

(65) Prior Publication Data

US 2004/0130884 A1 Jul. 8, 2004

(30) Foreign Application Priority Data

Dec. 26, 2002 (KR) .................. 10-2002-0084100

(51) Int. Cl.
*G02F 1/13* (2006.01)
(52) U.S. Cl. .................. 349/62; 349/61; 349/63; 349/64; 362/600; 362/602
(58) Field of Classification Search ........ 362/600–634, 362/551, 559, 560, 561; 359/227; 349/56–71
See application file for complete search history.

(56) References Cited

U.S. PATENT DOCUMENTS 6,559,827 B1 * 5/2003 Mangerson ............... 345/102
6,741,304 B2 * 5/2004 Nauta et al. ............... 349/65
6,827,458 B2 * 12/2004 Suga ........................ 362/609
2002/0135996 A1 * 9/2002 Suga ........................ 362/31

FOREIGN PATENT DOCUMENTS

JP           2001-210122 A    8/2001
KR           P1996-0029841    8/1996

* cited by examiner

*Primary Examiner*—Sandra O'Shea
*Assistant Examiner*—Anabel Ton
(74) *Attorney, Agent, or Firm*—Birch, Stewart, Kolasch & Birch, LLP

(57) ABSTRACT

A backlight unit for a display device and a liquid crystal display device using the backlight unit suppresses light leakage to a neighboring region with a display area that is divided and driven by a DDAM (Divided Display Area Method). The backlight unit in one aspect includes a main light guide plate defined by an n number of regions for a field sequential driving, auxiliary light guide plates arranged below edges of the main light guide plate, first and second reflection plates arranged below the main light guide plate and the auxiliary light guide plate, a plurality of light source parts arranged at a predetermined interval at both sides of the auxiliary light guide plate, and a housing configured to enclose a side of the main light guide plate, the auxiliary light guide plate and side and lower portion of the light source parts.

38 Claims, 18 Drawing Sheets

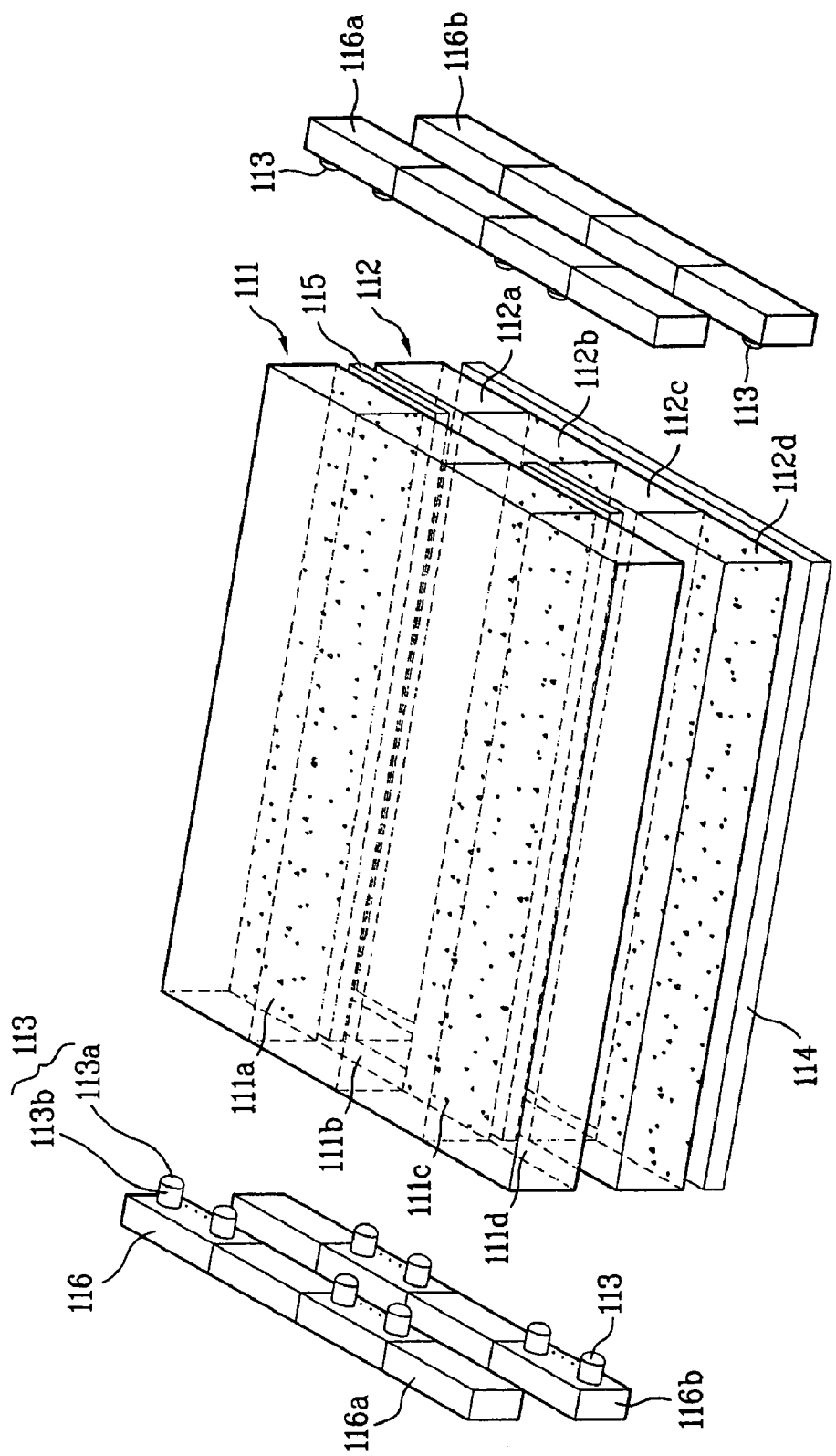

LED synchronized signal light

LIQUID CRYSTAL DISPLAY UNIT HAVING A FIELD SEQUENTIAL DRIVEN BACKLIGHT UNIT

This application claims the priority benefit of the Korean Patent Application No. P2002-84100 filed on Dec. 26, 2002, which is hereby incorporated by reference.

BACKGROUND OF THE INVENTION

1. Field of the Invention

The present invention relates to a backlight unit, and more particularly, to a backlight unit of a display device employing DDAM (Divided Display Area Method) in which a display area is divided into a plurality of regions for operation, among Field Sequential (FS) driving methods, and to a liquid crystal display device using the backlight unit.

2. Discussion of the Related Art

CRT (Cathode Ray tube), one of general display devices, is mainly being used as a monitor for television (TV), measuring machine, information terminal, etc., but fails to cope positively with requests for miniaturization and lightness of electronics products due to the size and weight of the CRT itself.

Thus, CRT has a limitation in decreasing the weight and volume, which is contrary to a current tendency of the miniaturization and lightness of the electronic products. As a candidate anticipated to replace the CRT, there are liquid crystal display (LCD) using electro-optical effect, plasma display panel (PDP) using gas discharge, electro-luminescence display (ELD) device, and so on. Among these candidates, LCD is most actively being researched.

In order to replace the CRTs, LCDs are actively being developed because of their small size, light weight, and lower power consumption characteristics. Recently, LCDs advance to a degree to perform the roles as a flat panel display, and are being used as monitors for laptop computers, desktop computers, large-sized information displays, etc., so that demands for the LCDs continue to increase.

The driving principle of liquid crystal display (LCD) devices utilizes optical anisotropy and polarization properties of liquid crystal. Liquid crystal has the directionality in their molecules alignment due to its slender and long structure. Hence, it is possible to control the orientation of the liquid crystal molecule by artificially applying an electric field to the liquid crystal.

Accordingly, by arbitrarily controlling the arrangement direction of the liquid crystal molecules, the alignment of the liquid crystal molecules is changed, so that an incident light is refracted in the alignment direction of the liquid crystal molecules to thereby display image information.

In nowadays, active matrix LCD (AM-LCD) in which thin film transistors (TFTs) as switching elements and pixel electrodes connected to the TFTs are arranged in a matrix configuration attracts public attention owing to its superior resolution and moving picture displaying capability.

Hereinafter, there will be reviewed a general liquid crystal display device in which image is realized by the aforementioned driving principle. FIG. 1 is a schematic view of a general liquid crystal display.

Referring to FIG. 1, the general liquid crystal display device includes: (a) a liquid crystal panel having first and second transparent glass substrates 1 and 10 attached to each other with a predetermined space therebetween, and a liquid crystal layer 15 interposed between the first and second glass substrates 1 and 10; and (b) a backlight 16 arranged on a rear side of the first glass substrate 10, for supplying the liquid crystal panel with light.

Here, the first glass substrate 1 serving as a TFT array substrate is provided with a plurality of gate lines (not shown) arranged at a predetermined interval in one direction, a plurality of data lines (not shown) arranged at a predetermined interval in another direction perpendicular to the gate lines, a plurality of pixel electrodes 2 arranged in a matrix configuration on pixel regions defined by the gate lines and the data lines crossing each other, and a plurality of thin film transistors (T) 3 each for being switched by a signal of the corresponding gate line and transferring a signal of the corresponding data line to the corresponding pixel electrode.

The second glass substrate 10 serving as a color filter substrate is provided with a black matrix layer 11 for shutting the light of the region except for the pixel region, a color filter layer 12 including red, green and blue cells for transmitting the light of a specific wavelength band and absorbing the lights of the remaining wavelength bands, and a common electrode 14 for realizing an image.

The non-described reference 13 denotes an overcoat layer.

The first and second glass substrates 1 and 10 are attached to each other by a sealant having a predetermined liquid crystal inlet and are spaced apart from each other with a predetermined space by spacers.

In FIG. 1, a unit pixel region is shown on the first and second glass substrates 1 and 10 for the convenience of description.

The liquid crystal display as described above needs a separate light source, that is, the backlight 16 so as to display an image by controlling the amount of the light applied from the external side to the liquid crystal panel.

Hereinafter, a general backlight unit will be described.

FIG. 2 illustrates a general backlight unit. As shown in FIG. 2, the general backlight unit includes a fluorescent lamp 21, a light guide plate 22, a diffusion material 23, a reflection plate 24, a diffusion plate 25 and a prism sheet 26.

First, when a voltage is applied to the fluorescent lamp 21, residual electrons in the fluorescent lamp 21 move to anode. The moving residual electrons collide with argon (Ar) molecules and excite the argon to increase cations. Increased cations collide with cathode to emit secondary electrons.

The emitted secondary electrons flow in the fluorescent lamp 21 to start discharging. The discharged electrons collide with mercuric vapor to ionize the mercuric vapor so that ultraviolet and visible lights are emitted. The emitted ultraviolet excites the fluorescent material coated on the inner wall of the lamp to emit visible light.

The light guide plate 22 serves as a wave-guide that allows the light emitted from the fluorescent lamp 21 to be incident into the inside of the liquid crystal panel and thus facial light to be projected upwards, and is made of poly methyl meth acrylate (PMMA) resin with good light transmittance.

As factors related to incident light efficiency of the light guide plate 22, there are the thickness of the light guide plate 22, the diameter of the lamp 21, the distance between the light guide plate 22 and the lamp 22, and the shape of the lamp reflection plate 24.

As the light guide plate 22 of the backlight unit for an LCD, there are a print type light guide plate, a V-cut type light guide plate and a scattering light guide plate.

The diffusion material 23 is composed of $SiO_2$ particles, PMMA and solvent. The above-mentioned $SiO_2$ particles are used for light diffusion and have porous particle structure.

PMMA is used to attach the $SiO_2$ particles to the lower surface of the light guide plate 22.

The diffusion material 23 is coated on the lower surface of the light guide plate 22 in a dot shape, and the dot area is gradually increased to obtain a uniform surface light source at the upper portion of the light guide plate 22. In other words, the dot area per unit area is small at a location close to the fluorescent lamp 21 and the dot area per unit area is large at a location far from the fluorescent lamp 21. Various shapes of the dots can be used. If the ratios of dot area per unit area are the same, the same brightness can be obtained at the upper portion of the light guide plate 22 regardless of the shape of the dots.

The reflection plate 24 is arranged below the light guide plate 22 and allows the light projected from the fluorescent lamp 21 to be applied into the light guide plate 22.

The diffusion plate 25 is arranged above the light guide plate 22 such that uniform brightness is obtained according to viewing angles. The material of the diffusion plate 25 is PET or poly carbonate (PC) resin. The upper portion of the diffusion plate 25 is coated with a particle coating layer for diffusing light.

The prism sheet 26 is used to enhance the front brightness of the light transmitted through the upper portion of the diffusion plate 25. The above-mentioned prism sheet 26 transmits only the light of a predetermined angle and fully reflects the light of other angles internally. The reflected light returns to the lower portion of the prism sheet 26. The returned light as described above is reflected by the reflection plate 24 attached to the lower portion of the light guide plate 22.

The backlight unit configured as above is fixed to a mold frame, and the display unit such as the liquid crystal panel disposed on the upper surface of the backlight unit is protected by a top chassis. The top chassis and the mold frame are coupled with each other accommodating the backlight unit and the display unit therebetween.

However, the general liquid crystal display configured as above has the following problems.

First, the transmittance of the light of the color filter of a general LCD device is less than 33% at most, which corresponds to a large light loss. To enhance the brightness by compensating for the light loss due to the color filter, the backlight should be made brighter. However, such a solution causes increase in the power consumption by the backlight and thus by the LCD device.

Second, since the color filter of a general LCD device is very expensive compared with the other materials of the LCD device, the color filter raises the production cost of the LCD device.

An LCD device suggested to solve these problems of the LCD device is a field sequential LCD device that implemented full-color without any color filter. The backlight of the general LCD device supplies the liquid crystal panel with white light in a state that the backlight is always turned on, but the field sequential LCD device turns on the R, G, B light sources of the backlight unit sequentially with a predetermined interval for one frame to display a color image. This field sequential method was suggested in 1960s, but it was very difficult to implement it since the technologies for a liquid crystal mode having a high speed response time and a light source meeting the high speed liquid crystal mode have to follow the field sequential method.

However, the recent amazing advancement in the LCD technologies enables to suggest a field sequential (FS) LCD device using a ferroelectric liquid crystal (FLC) mode, an optical compensated birefringent (OCB) mode or a twisted nematic (TN) liquid crystal mode and an R, G, B backlight unit that can turn on at a high speed.

Particularly, the field sequential LCD device mainly uses the OCB mode as the liquid crystal mode. The OCB cell is formed in a bend structure by rubbing the facing surfaces of an upper substrate and a lower substrate in the same direction and applying a predetermined voltage. If a voltage is applied, the liquid crystal molecules move rapidly so that the time necessary for realignment of the liquid crystal molecules, that is, the response time, is very quick and less than about 5 m/sec. Thus, since the OCB mode liquid crystal cell is a high speed response characteristic and does not nearly leave residual images on a screen, it is very suitable for a field sequential LCD device.

FIG. 3 is a schematic cross-sectional view of a general field sequential LCD device. As shown in FIG. 3, the general field sequential LCD device includes an upper substrate 30, a lower substrate 35 that is an array substrate, a liquid crystal layer 38 interposed between the upper and lower substrates 30 and 35, and R, G, B three color backlight 39 for supplying light to the liquid crystal panel including the upper and lower substrates 30 and 35 and the liquid crystal layer 38.

The upper and lower substrates 30 and 35 are respectively provided with a common electrode 32 and a pixel electrode 36 to which a voltage is applied so as to drive the liquid crystal layer 38. A black matrix 31 for shutting the light of the region except for the pixel electrode 36 of the lower substrate 35 is formed between the upper substrate 30 and the common electrode 32. A thin film transistor (T) 37 connected electrically to the pixel electrode 36 and acting as a switching element is formed on the lower substrate 35 at the position corresponding to the black matrix 31 of the upper substrate 30. Although not shown in the drawings, the thin film transistor (T) 37 includes a gate electrode, source electrode and drain electrode. Reference numeral 40 indicates an overcoat layer. For the convenience of description, only a unit pixel region of the upper and lower substrates 30 and 35 is shown in FIG. 3.

The above-mentioned field sequential LCD device can be apparently distinguished from the general LCD device in that the field sequential LCD device does not need the color filter layer and since the R, G, B light sources of the backlight unit are separately lit.

Hereinafter, the backlight unit having R, G, B light sources is briefly referred to as an R, G, B backlight.

The R, G, B backlight 39 is driven by one inverter (not shown). Each color of the backlight 39 lights 60 times per second and accordingly the three colors of the backlight 39 light 180 times per second to cause residual image effect on eyes and mix three colors. The R, G, B backlight 39 lights 180 times every second but looks like lighting on continuously.

For example, if the R light source lights and then the B light source lights, violet is seen to human eyes due to the residual image effect. The R, G, B backlight applies such a phenomenon. In other words, since the field sequential LCD device does not have any color filter, it can overcome the problem of the general LCD device where the light transmittance is low and the entire brightness of the LCD device is lowered. Also, since full color can be realized with three color backlight, high brightness and high definition characteristics can be obtained and production costs can be saved due to the omission of expensive color filter. As such, the field sequential LCD device is suitable for the large-sized LCD device.

Further, the general LCD device is inferior to the CRT in price and definition as described above, but the field sequential LCD device can solve this problem.

As described above, since most of LCD devices are passive devices that control the light amount from the external side to display images, they necessarily need a separate light source, i.e., backlight unit. In general, the backlight units of the LCD device are classified into a direct type and an edge type according to the arrangement of lamps.

In the direct type (or flat) backlight unit, since lamps are arranged on a plane, the shape of lamps is shown on the liquid crystal panel. To this end, it is necessary to secure a sufficient distance between the lamp and the liquid crystal panel. Also, light scattering means should be arranged for a uniform distribution of light amount. So, the direct type backlight LCD has a limitation in making the LCD device slim.

As the liquid crystal panel size increases, the area of the light output surface of the backlight unit increases too. If the direct type backlight unit is large-sized and the light scattering means does not secure a sufficient thickness, the light output is not flat. For this reason, it is required that the light scattering means should have a sufficient thickness.

In the meanwhile, in the edge type backlight unit, the lamps are disposed on an edge of the light guide plate, and the light guide plate is used to disperse the light by an entire surface thereof. The edge type backlight unit is problematic in low brightness since the lamp is installed at a side and light has to pass through the light guide plate. To distribute the light intensity uniformly, sophisticated optical design technology and processing technology for the light guide plate are required.

Since the direct type backlight unit and the edge type backlight unit have their disadvantages, the direct type backlight unit is usually used for the LCD device the brightness of which is more important than its thickness. The edge type backlight unit is usually used for the LCD device for a notebook PC or a monitoring PC the thickness of which is more important than its brightness.

FIGS. 4A and 4B are cross-sectional views of different backlight units for the field sequential LCD device. Specifically, FIG. 4A illustrates the edge type backlight unit and FIG. 4B illustrates the direct type backlight unit.

The edge type R, G, B backlight 40 shown in FIG. 4A is provided with a series of R, G, B light sources on one side surface or both side surfaces of a liquid crystal panel 41, and is a lighting apparatus that receives light from the light guide plate and reflection plate (not shown) and diffuses the light. The edge type R, G, B backlight 40 usually uses cold cathode fluorescent lamp (CCPL) as a light source. Since the edge type R, G, B backlight 40 has thin, light and low power consumption characteristics type, it is suitable for a portable computer.

The direct type R, G, B backlight 45 as shown in FIG. 4B is provided with R, G, B light sources 46 arranged below a scattering plate 47. Light from the R, G, B light sources 46 is directly irradiated onto the entire surface of the liquid crystal panel 41. The R, G, B light sources 46 constitute a plurality of single units each having R, G, B light sources 46 arranged in series horizontally.

This direct type R, G, B backlight 45 is used for an image display device the brightness of which is important. However, since it is too thick and needs the scattering plate to maintain the uniformity of the brightness, its power consumption is high.

FIG. 5A shows a portion of an array substrate of an LCD device to illustrate the driving method of the field sequential LCD device.

As shown in FIG. 5A, in general, the lower substrate that is an array substrate of the LCD device is provided with a plurality gate lines 50 in the horizontal direction, a plurality of data lines 51 crossing the gate lines 50 perpendicularly, a plurality of thin film transistors T each formed at the position at which the corresponding gate line 50 and the corresponding data line 51 cross each other, and a plurality of pixel electrodes 52 each connected electrically to the corresponding thin film transistor T.

In the driving method of the general LCD device, an image signal is applied to the data line 51 and an electric pulse is applied to the gate line 50 by a scanning method. The LCD device is driven by applying a selective gate pulse voltage to the gate line 50. To improve display quality, this gate pulse voltage applying method is a linear sequence driving method in which a voltage is applied to a gate line by one line by a gate scanning input device and is sequentially applied to a next gate line by a gate scanning input device line by line. The gate pulse voltage is applied to all the gate lines 50 so that one frame is completed.

In other words, if the gate pulse voltage is applied to the n-th gate line, all the thin film transistors T connected to this gate line to which the gate pulse voltage is applied are concurrently turned on. An image signal on the data line is stored in a liquid crystal cell and a storage capacitor through this turn-on thin film transistor T.

Accordingly, the liquid crystal molecules in the liquid crystal cell are realigned according to the data image signal stored in the liquid crystal cell and the voltage of the image signal so that the backlight is transmitted through the liquid crystal cell to realize the desired image.

FIG. 5B is a time chart illustrating the driving method of a field sequential LCD device according to a related art. In the driving method of the field sequential LCD device, all the thin film transistors are scanned according to R, G, B light sources and the liquid crystal molecules are completely realigned to the light from each of the R, G, B backlight sources. In other words, for the entire driving regions, the backlight unit is configured to light once every backlight source for one frame.

This driving process should be performed within one period (f/3) for each backlight source (R, G, B) of the backlight unit. In other words, considering one backlight source as a standard, one period for each backlight source is as follows:

$$f/3(55)=tTFT(56)+tLC(57)+tBL(58)$$

where f: frame frequency,
tTFT: scanning time of the entire thin film transistor,
tLC: response time of assigned liquid crystal, and
tBL: flash time of backlight.

Here, when tBL (58) is set to be a fixed value and tTFT (56) increases according to the design condition of the LCD device, since the interval between frames is fixed, the size of tLC (57) is decreased.

If tLC (57) is decreased and the actual response time is longer than the assigned response time of the liquid crystal, before the assigned liquid crystal is not yet arranged completely, the backlight emits light and the screen colors are distributed nonuniformly.

FIG. 6 is a flowchart illustrating one frame unit color image display of a field sequential LCD device according to a related art. In the field sequential LCD device, the color image display method sets one frame time to be 1/60 second and turns on and off the R, G, B three color light sources of the R, G, B backlight for 1/180 second (=5.5 msec) for 1/60 second sequentially. At this point, the time that the R, G, B light sources are actually turned on in one frame is shorter than 1/180 second. This is because colors can interfere among red, green and blue if an image is reproduced in a state that the R, G, B light sources are turned on continuously.

As shown in FIG. 6, in the field sequential LCD device, the display of a color image is performed in a sequence of constructing three sub-frames s1, s2 and s3 corresponding to R, G, B color for one frame F that is a basic unit of the screen, turning on and off each of R, G, B light sources 60a, 60b and 60c of a backlight unit sequentially by the interval of 1/180 second, and supplying the liquid crystal panel 61 with the light to display a color image.

But, the field sequential driving method as discussed above is difficult to drive in one frame since the response speed of the liquid crystal is slow. To solve this problem, a divided display area method (DDAM) is used in which a display area is divided into several regions to drive an LCD device.

Next, the backlight unit of a general LCD device driven in the DDAM will be described by referring to FIG. 7.

As shown in FIG. 7, in the general LCD device driven in the DDAM, LED light sources 72 as a backlight unit are disposed on the two opposite sides of a light guide plate 71 configured on the rear surface of the liquid crystal panel (not shown). The liquid crystal panel is lit by the LED light sources 72 so that an image can be displayed in dark place.

Here, each LED light source 72 includes LED lamps 73 arranged in one dimension. The LED lamps 73 are arranged sequentially with red LED, green LED and blue LED on a PCB.

Here, the light guide plate 71 is divided into four regions so as to divide the liquid crystal screen into four regions. The four regions are first to fourth regions 71a, 71b, 71c and 71d and the divided four regions of the liquid crystal screen are drive sequentially. Here, the light guide plate 71 is not physically separated but is defined to be imaginarily divided into four regions.

The LED lamps 73 are turned on by applying a voltage according to the divided regions of the light guide plate 71. The turned-on red, green and blue lights are scattered so that the rear surface of the liquid crystal panel is sequentially lit.

As described above, the LED lamps 73 of each LED light source 72 are turned on sequentially such that only the LED lamp(s) 73 corresponding to a particularly divided region of the plate 71 are driven at a given time to display an image on the liquid crystal panel field sequentially.

However, when only the LED lamps 73 corresponding to a particular divided region of the plate 71 are turned on and driven (when driven in DDAMO), there is generated a light leakage phenomenon in that light is leaked to a neighboring divided region of the light guide plate and liquid crystal panel other than the driving region. Such light leakage deteriorates the display performance of the LCD device.

SUMMARY OF THE INVENTION

Accordingly, the present invention is directed to a backlight unit of a display device and an LCD device using the same that substantially obviate one or more problems due to limitations and disadvantages of the related art.

An object of the present invention is to provide a backlight unit of a display device and a liquid crystal display device using the same in which light leakage to a neighboring region is suppressed when a display area is divided and driven by a DDAM (Divided Display Area Method) among field sequential (FS) driving methods, thereby enhancing the display performance.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a backlight unit for a display device, comprising: a main light guide plate defined into an n number of regions for a field sequential driving; a plurality of auxiliary light guide plates arranged below edge portions of the main light guide plate; first and second reflection plates arranged below the main light guide plate and the auxiliary light guide plates; a plurality of light source parts arranged at a predetermined interval at sides of the auxiliary light guide plates; and a housing configured to enclose at least parts of the main light guide plate, the auxiliary light guide plates and the light source parts.

In accordance with an aspect of the present invention, there is provided a backlight unit for a display device, comprising: first to n-th light guide plates corresponding to an n number of regions for a field sequential driving; a reflection plate arranged below the first to n-th light guide plates; a plurality of light source parts arranged at a predetermined interval at both sides of the first to n-th light guide plates; and a PCB substrate provided with the light source parts arranged at both sides of the first to n-th light guide plates.

In accordance with another aspect of the present invention, there is provided a backlight unit for a display device, comprising: upper and lower light guide plates each divided into first to n-th regions for a field sequential driving; a plurality of light sources arranged in a zigzag configuration at sides of the first to n-th regions of the upper and lower light guide plates; a first reflection plate arranged below the lower light guide plate; and at least one second reflection plate each positioned below one of the first to n-th regions of the upper light guide plate, adjacent to which the light sources are arranged.

In accordance with another aspect of the present invention, there is provided a backlight unit for a display device, comprising: a light guide plate divided into an n number of regions for a field sequential driving; a reflection plate arranged below the light guide plate; a plurality of light sources arranged at a predetermined interval at sides of the light guide plate; a PCB substrate supporting the light sources; and an optical shutter arranged above the light guide plate and driven in synchronization with an operation of the light sources.

In accordance with another aspect of the present invention, there is provided a backlight unit for a display device, comprising: a plurality of light sources arranged on a substrate; a diffusion plate arranged above the light sources, for uniformly diffusing light irradiated from the light sources; and an optical shutter divided into an n number of regions for a field sequential driving and driven in synchronization with the light sources.

In accordance with another aspect of the present invention, there is provided a liquid crystal display device using a backlight unit, the liquid crystal display device comprising: (a) the backlight unit including: a main light guide plate defined by an n number of regions for a field sequential driving; a plurality of auxiliary light guide plates arranged below edge portions of the main light guide plate; first and second reflection plates arranged below the main light guide plate and the auxiliary light guide plates; a plurality of light source parts arranged at a predetermined interval at sides of the auxiliary light guide plates; and a housing configured to enclose at least parts of the main light guide plate, the auxiliary light guide plates and the light source parts; and (b) a liquid crystal panel above the backlight unit.

In accordance with another aspect of the present invention, there is provided a liquid crystal display device using a backlight unit, the liquid crystal display device comprising: (a) the backlight unit including: first to n-th light guide plates corresponding to an n number of regions for a field sequential driving; a reflection plate arranged below the first to n-th light guide plates; a plurality of light source parts arranged at a predetermined interval at both sides of the first to n-th light guide plates; and a PCB substrate in which the light source parts are arranged at both sides of the first to n-th light guide plates; and (b) a liquid crystal panel above the backlight unit.

In accordance with another aspect of the present invention, there is provided a liquid crystal display device using a backlight unit, the liquid crystal display device comprising: (a) the backlight unit including: upper and lower light guide plates each divided into first to n-th regions for a field sequential driving; a plurality of light sources arranged in a zigzag configuration at sides of the first to n-th regions of the upper and lower light guide plates; a first reflection plate arranged below the lower light guide plate; and at least one second reflection plate each positioned below one of the first to n-th regions of the upper light guide plate, adjacent to which the light sources are arranged; and (b) a liquid crystal panel above the backlight unit.

In accordance with another aspect of the present invention, there is provided a liquid crystal display device using a backlight unit, the liquid crystal display device comprising: (a) the backlight unit including: a light guide plate divided into an n number of regions for a field sequential driving; a reflection plate arranged below the light guide plate; a plurality of light sources arranged at a predetermined interval at sides of the light guide plate; a PCB substrate supporting the light sources; and an optical shutter arranged above the light guide plate and driven in synchronization with an operation of the light sources; and (b) a liquid crystal panel above the backlight unit.

In accordance with another aspect of the present invention, there is provided a liquid crystal display device using a backlight unit, the liquid crystal display device comprising: (a) the backlight unit including: a plurality of light sources arranged on a substrate; a diffusion plate arranged above the light sources, for uniformly diffusing light irradiated from the light sources; and an optical shutter divided into an n number of regions for a field sequential driving and driven in synchronization with the light sources; and (b) a liquid crystal panel above the backlight unit.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 11 is a perspective view of an FS type backlight unit according to a third embodiment of the present invention;

DETAILED DESCRIPTION OF THE PREFERRED EMBODIMENTS

Reference will now be made in detail to the preferred embodiments of the present invention, examples of which are illustrated in the accompanying drawings.

As aforementioned, the invention is provided to prevent light from being leaked to a neighboring region other than turn-on region or turn-off region in a DDAM operation. Hereinafter, the inventive descriptions will be made every embodiment.

According to a first embodiment of the invention, a backlight unit for a display device such as an LCD device includes a main light guide plate, a lamp housing configured concave, and auxiliary light guide plates further arranged below both sides of the main light guide plate.

In the invention, the display area (e.g., corresponding the display area of the LCD device) can be divided into an n number of regions intentionally. In the below, as an example, a four division driving backlight unit in which the light guide plate is divided into four regions will be described.

Figure 1:
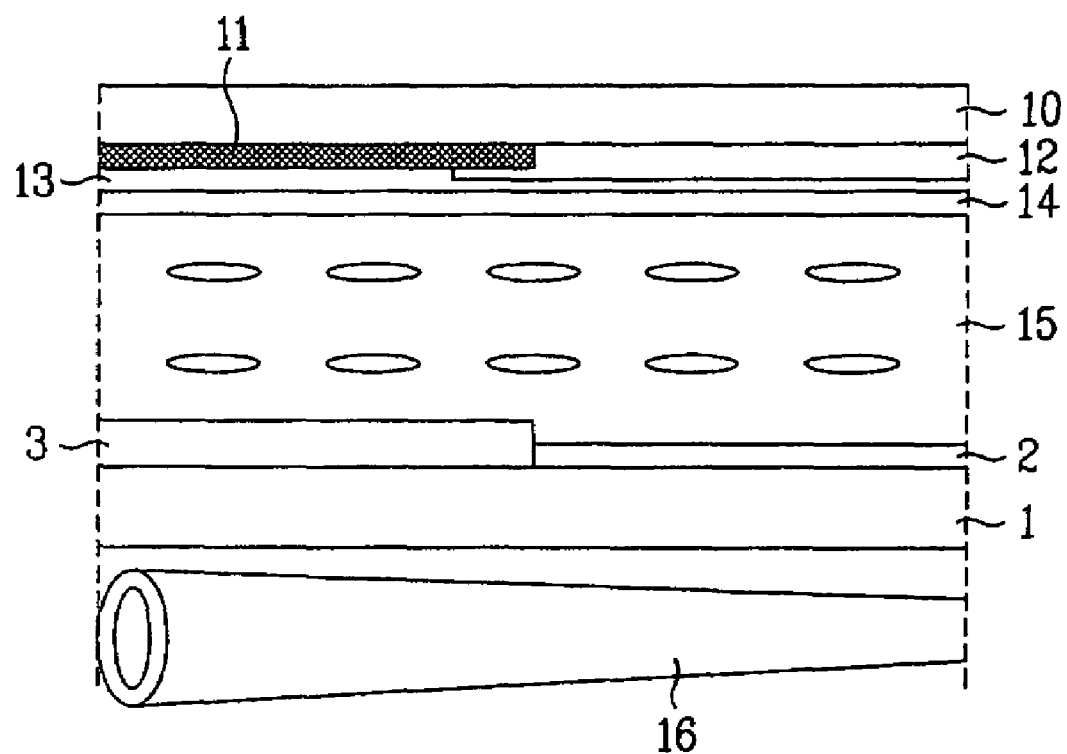
FIG. 1 is a schematic sectional view of a general LCD.
Figure 2:
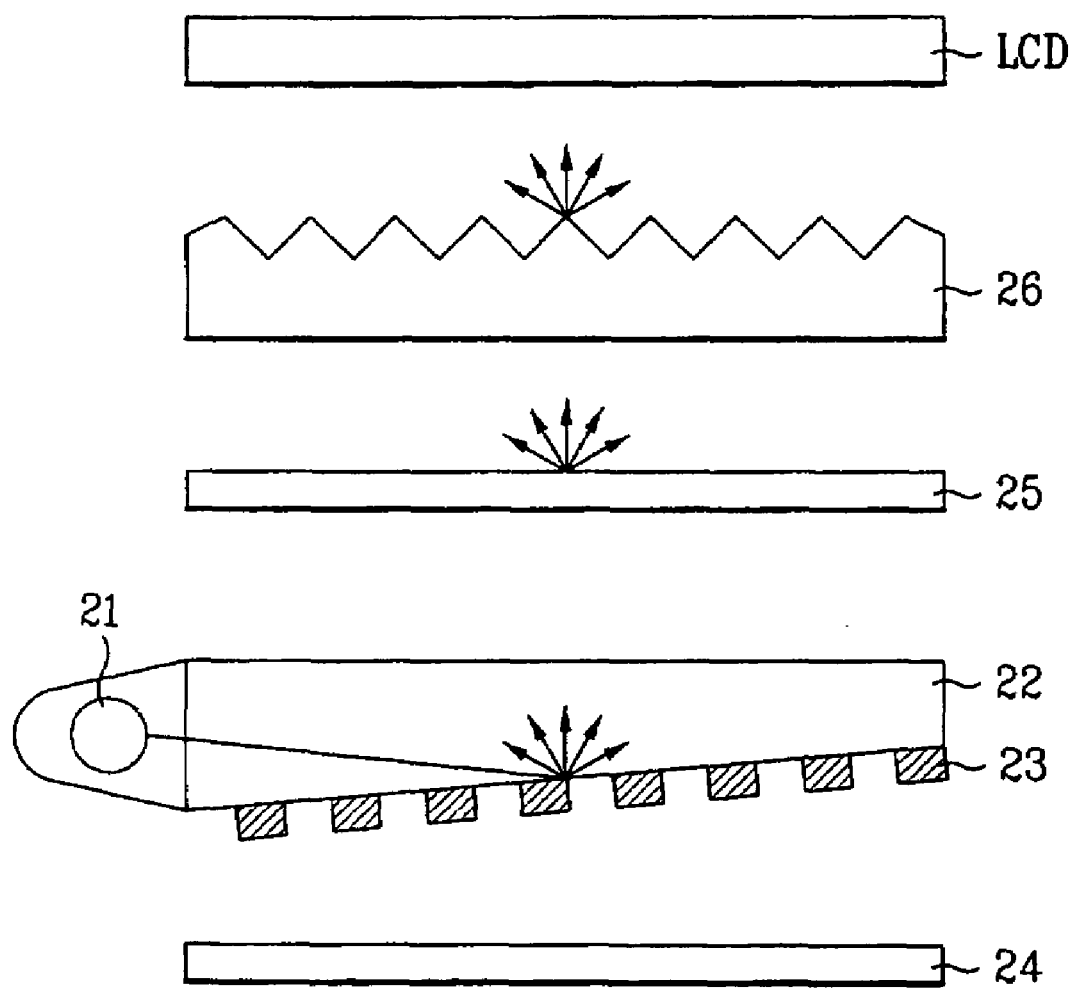
FIG. 2 illustrates a general backlight unit structure.
Figure 3:
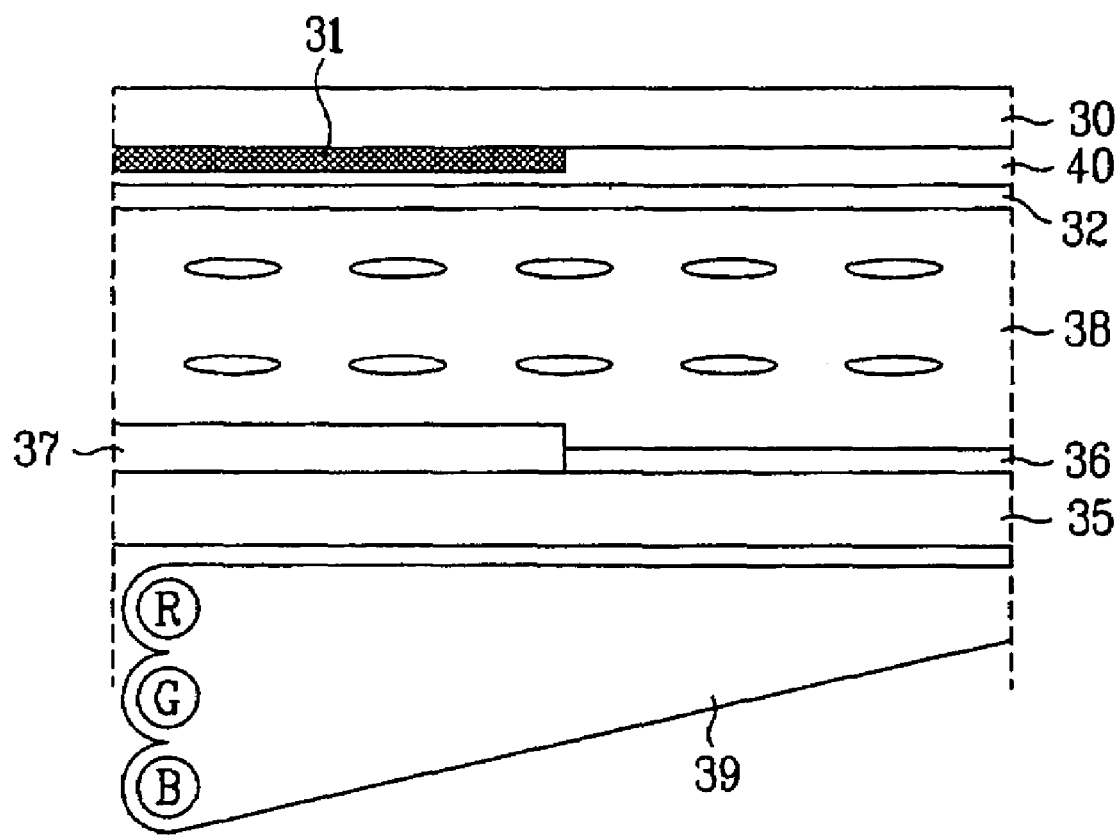
FIG. 3 is a schematic sectional view of a general FS (Field Sequential) type LCD.
Figure 4A:
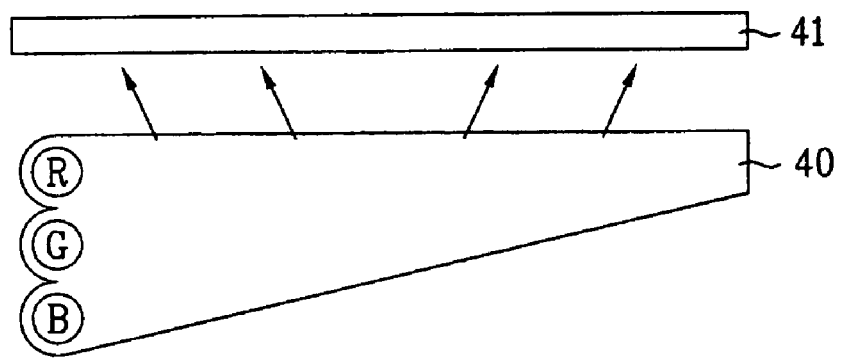
FIG. 4A is a sectional view of an edge-light type three color backlight in a general FS type LCD.
Figure 4B:
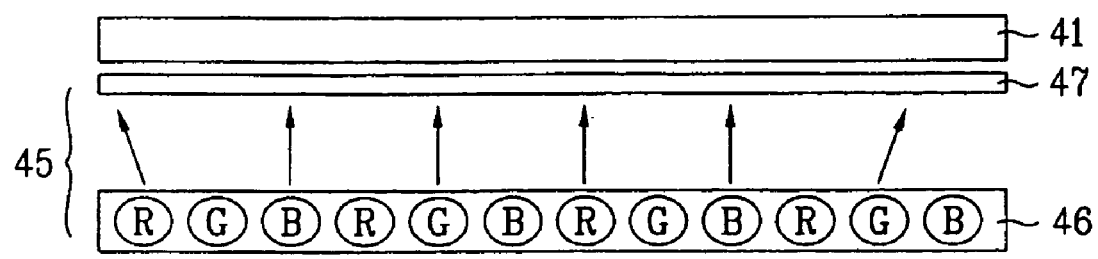
FIG. 4B is a sectional view of a direct type three color backlight in a general FS type LCD.
Figure 5A:
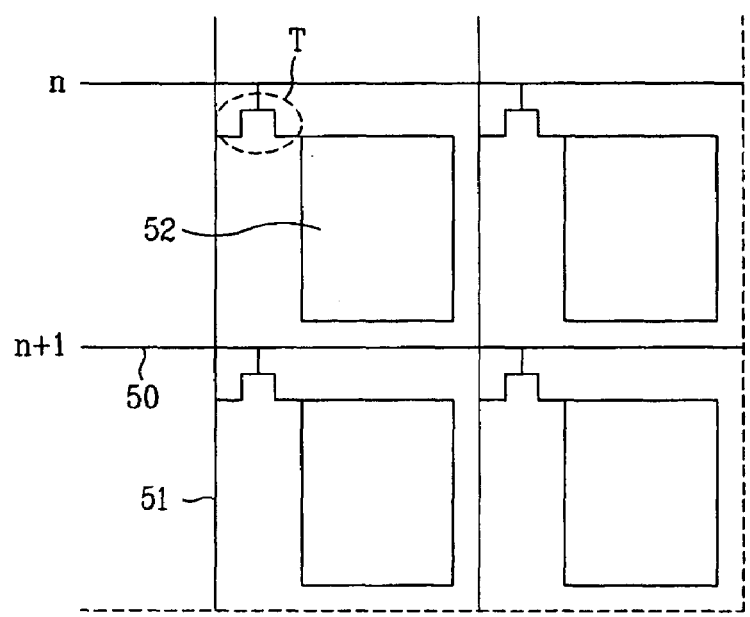
FIGS. 5A and 5B illustrate a driving method of a general FS type LCD.
Figure 5B:
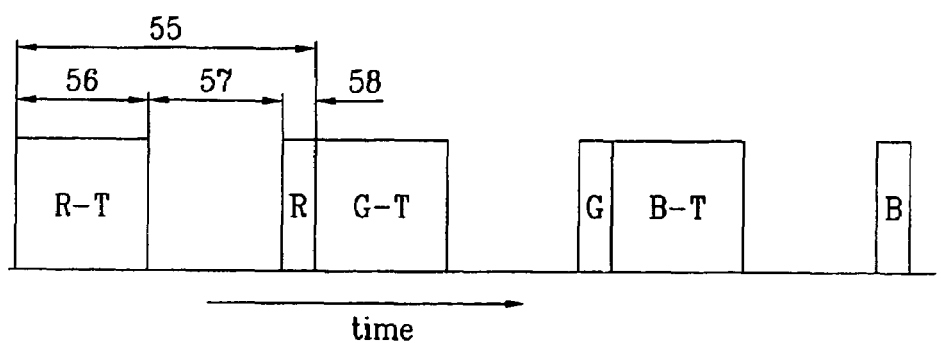
Figure 6:
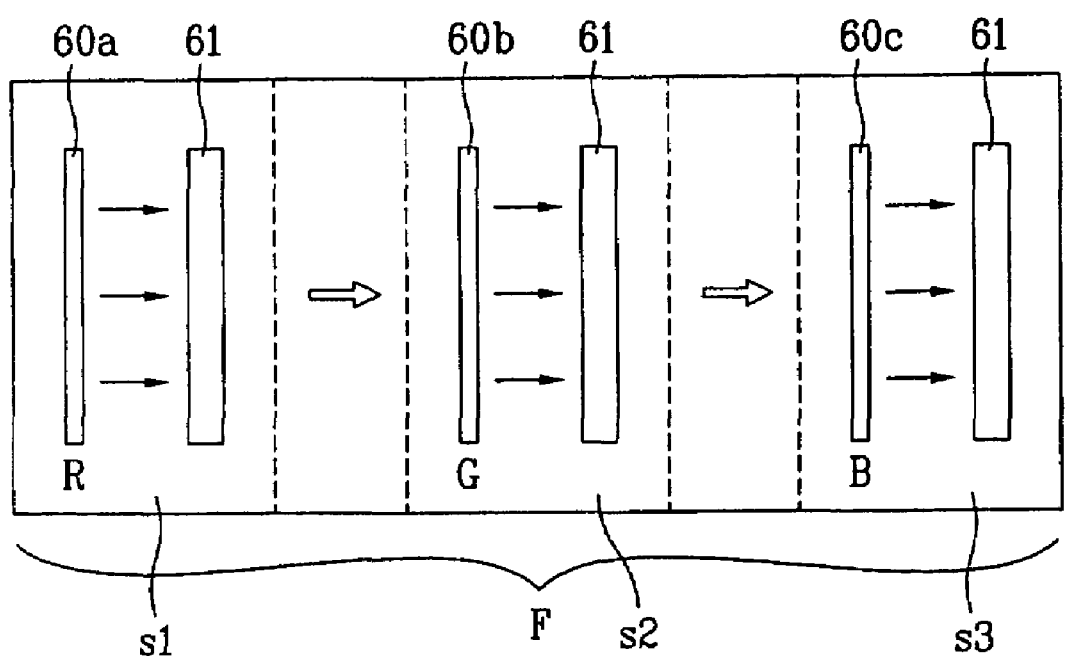
FIG. 6 is a schematic view illustrating to display a color image in a unit of frame a general FS type LCD.
Figure 7:
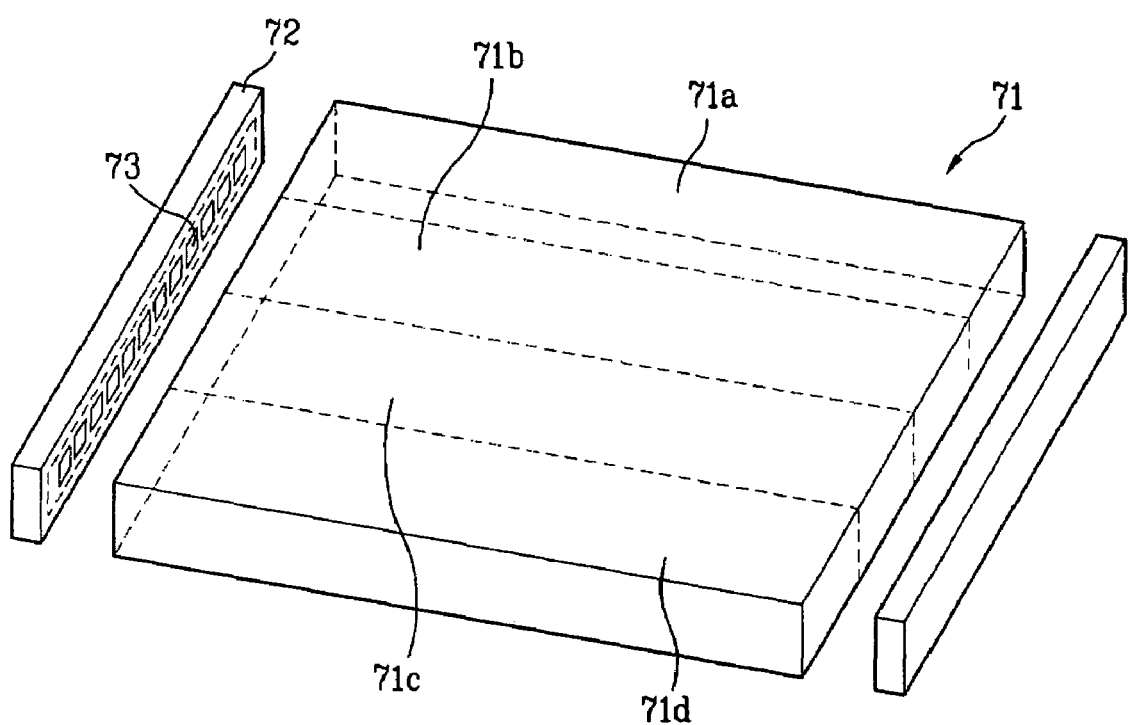
FIG. 7 is a perspective view of a backlight unit using an LED according to a related art.
Figure 8A:
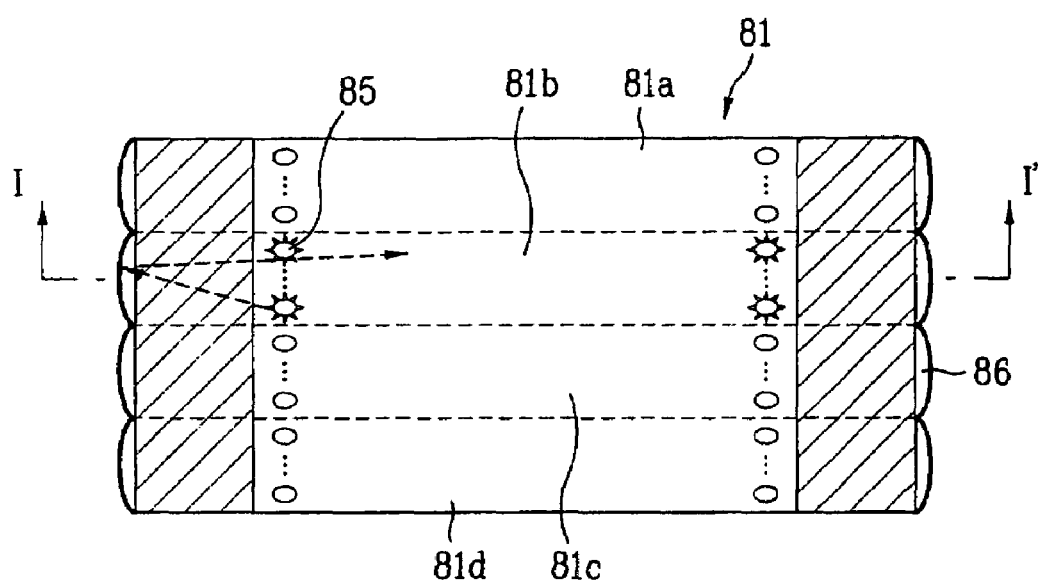
FIG. 8A is a plan view of a backlight unit in a display device according to a first embodiment of the present invention.
Figure 8B:
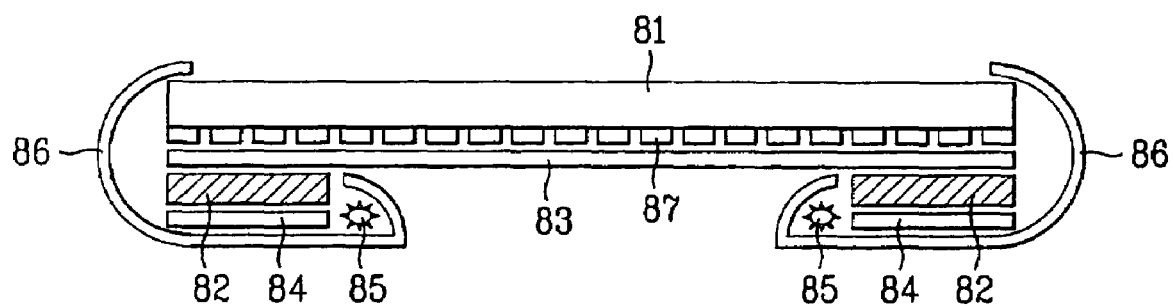
FIG. 8B is a sectional view taken along the line I-I' of FIG. 8A.

FIG. 8A is a top plan view of a backlight unit usable with or in a display device such as an LCD device according to the first embodiment of the present invention, and FIG. 8B is a cross-sectional view taken along the line I-I' of FIG. 8A.

As shown in FIGS. 8A and 8B, the backlight unit according to the first embodiment of the present invention is configured to include a main light guide plate 81, which is divided into four regions to be FS (field sequential) driven by a DDAM method, auxiliary light guide plates 82 arranged below two side edges of the main light guide plate 81 in one direction with a width smaller than the main light guide plate 81, first and second reflection plates 83 and 84 respectively arranged below the main light guide plate 81 and the auxiliary light guide plates 82, a plurality of LED lamps 85 arranged at side portions of the auxiliary light guide plates 82 at a constant interval, and a lamp housing 86 extending to enclose the sides of the main light guide plate 81, the auxiliary light guide plates 82, and the sides and lower portions of the LED lamps 85, for concentrating light irradiated from the LED lamps 85 in one direction.

On the lower surface of the main light guide plate 81, a plurality of dot patterns 87 are formed such that the light irradiated from the LED lamps 85 is outputted to the lower surface of the Liquid crystal panel.

The main light guide plate 81 is divided into and defined by first, second, third and fourth regions 81a, 81b, 81c and 81d. The four divided regions 81a, 81b, 81c and 81d are FS-driven sequentially.

The first and second reflection plates 83 and 84 function to reflect light, which is incident to the main light guide plate 81 and the auxiliary light guide plates 82, toward the Liquid crystal panel.

The LED lamps 85 include R (Red), G (Green) and B (Blue) light sources to supply light to the Liquid crystal panel. These light sources may be sequentially or alternatively arranged as needed.

The lamp housing 86 is shaped concave at side portions of the main light guide plate 81 and the auxiliary light guide plates 82.

In the above, the reason why the auxiliary light guide plates 82 are arranged below the opposite side edges of the main light guide plate 81 is to prevent light from being directly incident onto the main light guide plate 81 from the LED lamps 85, and is to allow the light of the LED lamps 85 to be reflected by the lamp housing 86 and the guide plates 82 and then be incident onto the main light guide plate 81.

Also, the reason why the lamp housing 86 is shaped concave is, when the light of the LED lamps 85 is reflected by the lamp housing 86 and incident onto the main light guide plate 81, to minimize the reflecting angle of the light reflected from the lamp housing 86 toward the main light guide plate 81 and to minimize the light from being leaked to a neighboring region other than the FS region.

In concrete, FIGS. 8A and 8B show that light is incident onto the second region 81b of the main light guide plate 81. Light is irradiated from the LED lamp(s) 85 corresponding to the second region 81b, is scattered at the corresponding portions of the auxiliary light guide plates 82, and then is transmitted to the inside of the lamp housing 86. The light transmitted to the inside of the lamp housing 86 is again reflected by the lamp housing 86 and is transmitted to the main light guide plate 81.

The light transmission described above is performed sequentially from the first region to the fourth region (81a to 81d) or in other desired sequences, and light leakage to a neighboring region other than the FS driven region is minimized due to the structural characteristics of the backlight unit including the lamp housing 86.

According to a second embodiment of the invention, a backlight unit for a display device such as an LCD device includes a light guide plate divided into multiple regions corresponding to the number of FS driven regions.

Figure 9:
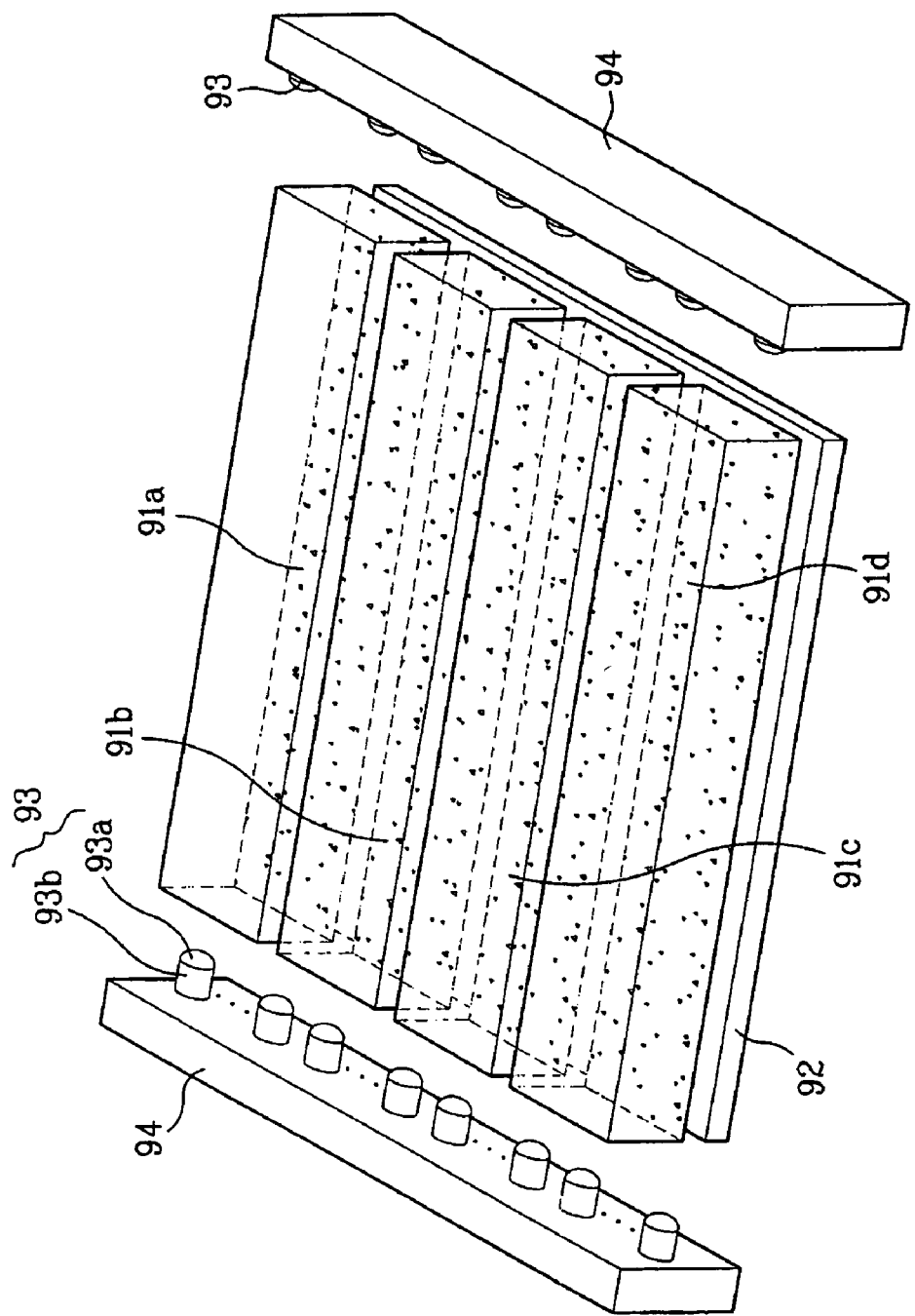
FIG. 9 is a perspective view of an FS type backlight unit according to a second embodiment of the present invention.
Figure 10A:
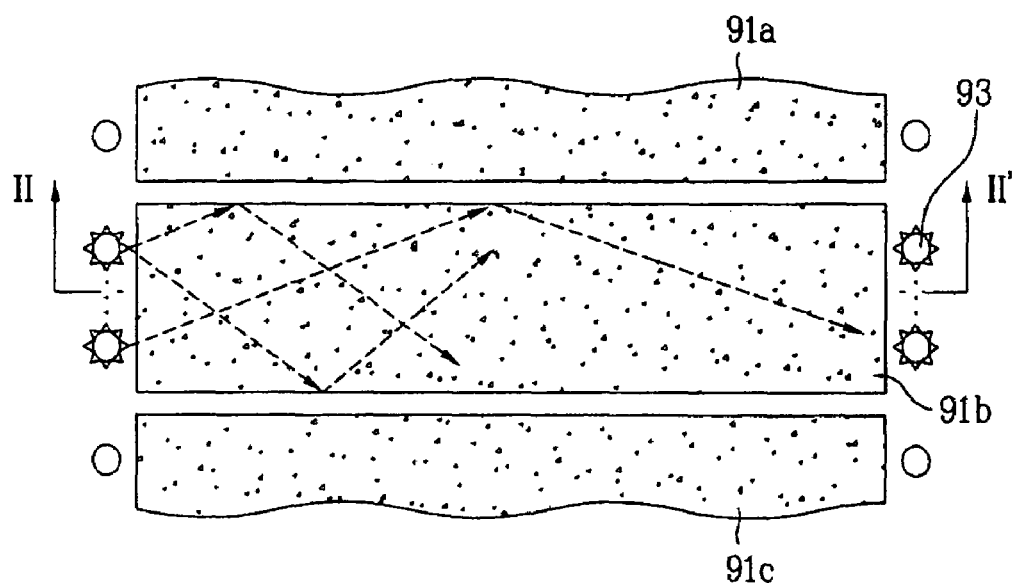
FIG. 10A is a driving plan view of a backlight unit according to a second embodiment of the present invention.
Figure 10B:
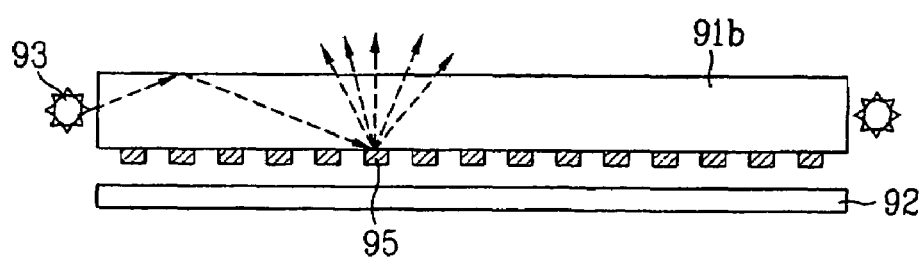
FIG. 10B is a sectional view taken along the line II-II' of FIG. 10A.

FIG. 9 is a perspective view of an FS type backlight unit usable with or in an LCD device according to the second embodiment of the present invention, FIG. 10A is a driving top plan view of the backlight unit of FIG. 9, and FIG. 10B is a cross-sectional view taken along the line II-II' of FIG. 10A.

In the invention, the display area can be divided into an n number of regions intentionally. In the below, as an example, a four division driving backlight unit in which the light guide plate is divided into four regions will be described.

As shown in FIG. 9, the backlight unit according to the second embodiment of the present invention is configured to include first to fourth light guide plates 91a, 91b, 91c and 91d, which are divided into four regions to be FS (field sequential) driven, a reflection plate 92 arranged below the first to fourth light guide plates 91a, 91b, 91c and 91d, a plurality of LED lamps 93 arranged at both side portions of the first to fourth light guide plates 91a, 91b, 91c and 91d at a constant interval, and a PCB substrate 94 provided with the plurality of LED lamps 93 arranged at both side portions of the first to fourth light guide plates 91a, 91b, 91c and 91d.

Each of the LED lamps 93 includes a light emitting portion 93a and a body portion 93b mounted on the PCB substrate 94.

On the lower surfaces of the first to fourth light guide plates 91a, 91b, 91c and 91d, a plurality of dot patterns 95 are formed to scatter and disperse the incident light.

In the backlight unit constructed as above, the first to fourth light guide plates 91a, 91b, 91c and 91d are sequentially driven. Lights which are incident onto the respective light guide plates 91a, 91b, 91c and 91d are fully reflected therein due to a difference in the refractive indexes between air and the light guide plates 91a-91d and thereby the propagation of the light to a region other than the driving region is suppressed.

Specifically, FIG. 10A is a top plan view showing that the light of the LED lamps 93 is incident onto the second light guide plate 91b. As shown in FIG. 10A, light which is incident onto the second light guide plate 91b from the LED lamp 93 in a region corresponding to the second light guide plate 91b is fully reflected therein due to a difference in the refractive indexes between air and the second light guide plate 91b and thereby the propagation of the light to the other regions (the first, third and fourth light guide plates 91a, 91c and 91d) other than the current driving region is suppressed.

And, as shown in FIG. 10B, the light which is incident onto the second light guide plate 91*b* is scattered and dispersed by the dot patterns 95 printed on the lower surface of the second light guide plate 91*b* and then transmitted to the Liquid crystal panel (not shown).

As aforementioned, if the light guide plate is divided into multiple light guide plates corresponding to the number of the FS driven regions, light, which is incident into each of the light guide plates, is fully reflected therein, so that light leakage to a neighboring region (e.g., neighboring light guide plates, etc.) other than the current FS driven region can be effectively suppressed.

According to a third embodiment of the invention, a backlight unit for a display device such as an LCD device includes two sheets of light guide plates arranged in a stack structure and LED lamps arranged in a zigzag at the side portions of the upper and lower light guide plates.

Figure 12:
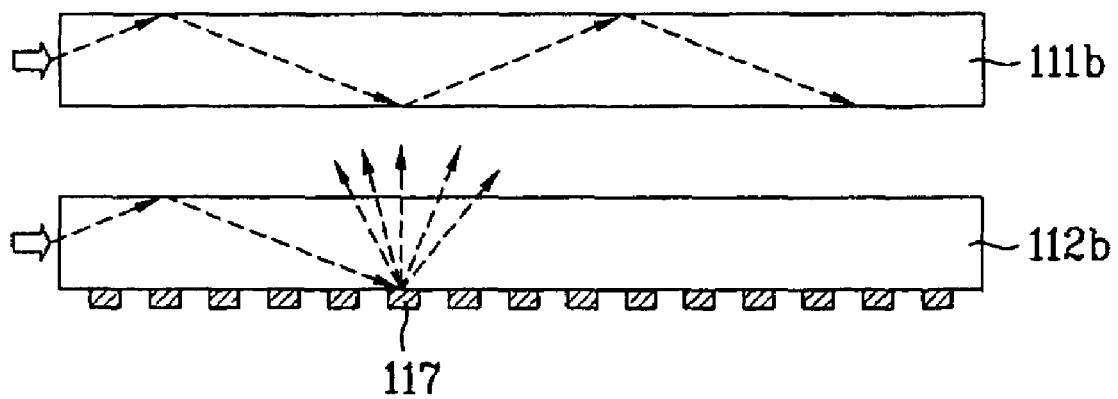
FIG. 12 is a sectional view illustrating structure and operation of upper and lower light guide plates according to a third embodiment of the present invention.

FIG. 11 is a perspective view of an FS type backlight unit usable with or in a display device such as an LCD device according to the third embodiment of the present invention, and FIG. 12 is a sectional view illustrating the structure and operation of upper and lower light guide plates of FIG. 11.

In the invention, the display area can be divided into an n number of regions intentionally. In the below, as an example, a backlight unit in which the light guide plate is divided into four regions will be described.

As shown in FIG. 11, the backlight unit according to the third embodiment of the present invention is configured to include upper and lower light guide plates 111 and 112, each of which is divided into four regions to be FS (field sequential) driven by a DDAM method, a plurality of LED lamps 113 arranged in a zigzag configuration at both side portions of first to fourth regions 111*a*, 111*b*, 111*c* and 111*d* of the upper light guide plate 111 and at both side portions of the first to fourth regions 112*a*, 112*b*, 112*c* and 112*d* of the lower light guide plate 112, a first reflection plate 114 arranged below the lower light guide plate 112, second reflection plates 115 arranged only below a region where the LED lamps 113 are arranged adjacent the upper light guide plate 111, and a PCB (printed circuit board) substrate 116 provided with the plurality of LED lamps 113 arranged at the both side portions of the upper and lower light guide plates 111 and 112. The PCB substrate 116 can be one or multiple separate parts 116*a*, 116*b* as shown and has circuits for driving the lamps and any other parts as needed. The parts 116*a* and 116*b* correspond to the upper and lower light guide plates 111 and 112, respectively.

The zigzag configuration of the LED lamps 113 involves formation of the LED lamps 113 on the first and second parts 116*a* and 116*b* of the PCB substrate 116. For instance, as shown in FIG. 11, the LED lamps 113 are provided on only those portions of the first part 116*a* that correspond to (or adjacent to) the first and third regions 111*a* and 111*c* of the upper light guide plate 111. The LED lamps 113 are also provided on only those portions of the second part 116*b* that correspond to (or adjacent to) the second and fourth regions 112*b* and 112*d* of the lower light guide plate 112.

Each of the LED lamps 113 includes a light emitting portion 113*a* and a body portion 113*b* mounted on the PCB substrate 116.

As aforementioned, each of the upper and lower light guide plates 111 and 112 is divided into four regions so as to be FS driven by a DDAM method.

On the lower surfaces of the upper and lower light guide plates 111 and 112 adjacent to which the LED lamps 113 are arranged, a plurality of dot patterns 117 are formed or printed. That is, the data patterns 117 are provided only on those regions of the upper and lower plates 111 and 112 adjacent to which the LED lamps 113 are provided. For instance, at both sides of the first and third regions 111*a* and 111*c* of the upper light guide plate 111, the LED lamps are arranged and accordingly, the plurality of dot patterns 117 are formed on the lower surface of the first and third regions 111*a* and 111*c* of the upper light guide plate 111. At both sides of the second and fourth regions 112*b* and 112*d* of the lower light guide plate 112, the LED lamps 113 are arranged and accordingly, the plurality of dot patterns 117 are formed on the lower surface of the second and fourth regions 112*b* and 112*d* of the lower light guide plate 112.

In the meanwhile, in this example, at both sides of the second and fourth regions 111*b* and 111*d* of the upper light guide plate 111, and at both sides of the first and third regions 112*a* and 112*c* of the lower light guide plate 112, the LED lamps 113 are not formed. Accordingly, the plurality of dot patterns 117 are not formed on the lower surfaces of the second and fourth regions 111*b* and 111*d* of the upper light guide plate 111 and on the lower surfaces of the first and third regions 112*a* and 112*c* of the lower light guide plate 112.

As mentioned, the dot patterns 117 are arranged only on the lower surfaces of the light guide plate regions where the corresponding LED lamps are provided.

In the backlight unit constructed as above, in this example, the corresponding LED lamps 113 are turned on such that the light guide plates 111 and 112 are driven in the order of the first region 111*a* of the upper light guide plate 111, the second region 112*b* of the lower light guide plate 112, the third region 111*c* of the upper light guide plate 111 and the fourth region 112*d* of the lower light guide plate 112. The light which is incident onto the upper and lower light guide plates 111 and 112 through the LED lamps 113 is outputted to the Liquid crystal panel by the scattering operation provided by the dot patterns 117 printed on the lower surface of each light guide plate. In other words, the order in which the different regions of the light guide plates are turned on will vary depending on the configuration of the backlight unit, such as the locations of the LED lamps.

The light, which is incident onto the light guide plate as above, is scattered, dispersed and outputted to the Liquid crystal panel by the dot patterns.

As one example, the light path in the second region 111*b*, 112*b* of the upper and lower light guide plates 111 and 112 will be described below by referring to FIGS. 11 and 12.

In the second region 111*b* of the upper light guide plate 111 where the dot patterns 117 are not printed on the lower surface thereof, most of the light having a refractive angle greater than the critical angle is fully reflected inside the light guide plate 111 and thus is not outputted to the Liquid crystal panel. On the contrary, in the second region 112*b* of the lower light guide plate 112 where the dot patterns 117 are printed on the lower surface thereof, the light is scattered by the dot patterns 117 and thus is outputted to the Liquid crystal panel.

Accordingly, as aforementioned, if the two sheets of the light guide plates are arranged in a stack structure, and the LED lamps 113 and the dot patterns 117 are dispersedly arranged in a zigzag configuration, light leakage to a neighboring region (e.g., other regions of the upper and/or lower guide plates, etc.) other than the FS driven region can be effectively prevented.

According to a fourth embodiment of the invention, a backlight unit for a display device such as an LCD device includes an optical shutter arranged between the light guide plate and the Liquid crystal panel.

Figure 13:
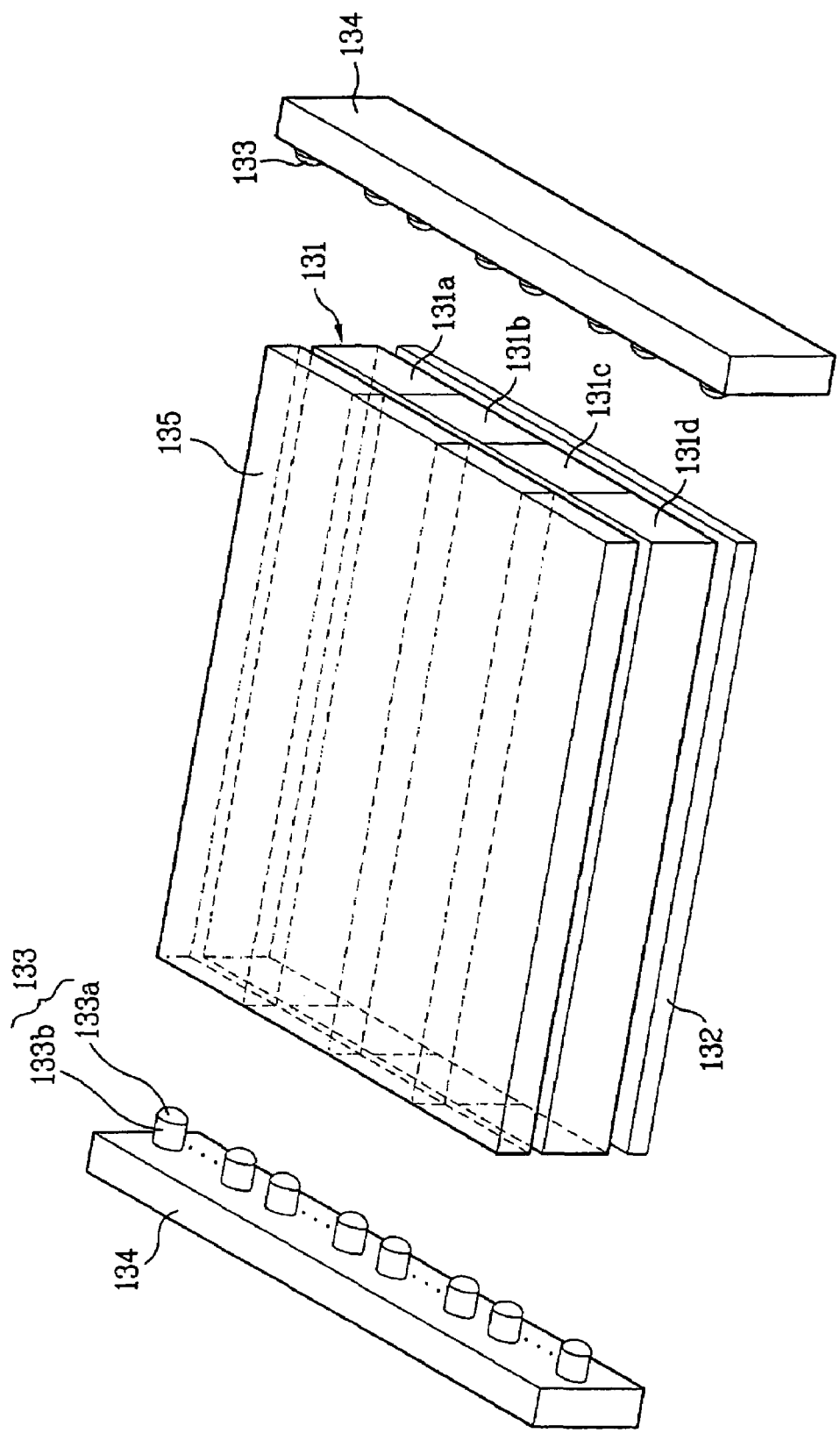
FIG. 13 is a perspective view of an FS type backlight unit according to a fourth embodiment of the present invention.
Figure 14:
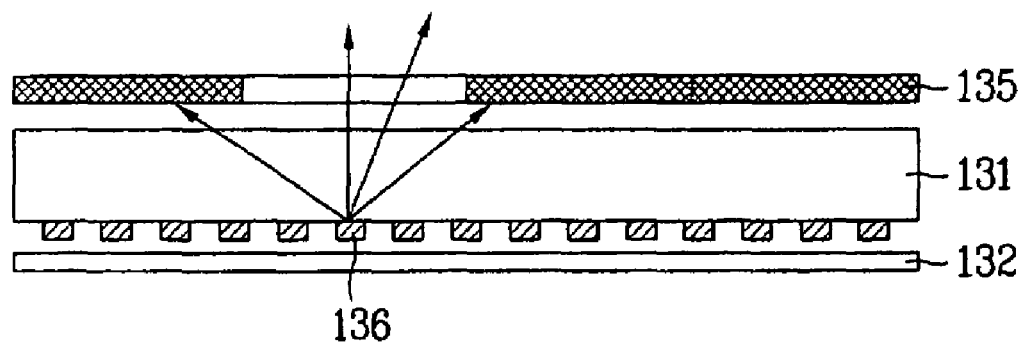
FIG. 14 is a sectional view of a backlight unit according to a fourth embodiment of the present invention.

FIG. 13 is a perspective view of an FS type backlight unit usable with or in a display device such as an LCD device according to the fourth embodiment of the present invention, and FIG. 14 is a sectional view of the backlight unit in FIG. 13.

In the invention, the display area can be divided into an n number of regions intentionally. In the below, as an example, a four division driving backlight unit in which the light guide plate is divided into four regions will be described.

As shown in FIGS. 13 and 14, the backlight unit according to the fourth embodiment of the present invention is configured to include a light guide plate 131, which is divided into four regions to be FS (field sequential) driven by a DDAM method, a reflection plate 132 arranged below the light guide plate 131, a plurality of LED lamps 133 arranged at opposite side portions of the light guide plate 131 at a constant interval, a PCB substrate 134 provided with the plurality of LED lamps 93 and arranged at both side portions of the light guide plate 131, and an optical shutter 135 arranged on the light guide plate 131 and driven in synchronization with the operation of the LED lamps 133.

Each of the LED lamps 133 includes a light emitting portion 133a and a body portion 133b mounted on the PCB substrate 134.

On the lower surface of the light guide plate 131, a plurality of dot patterns 136 are formed or printed.

The optical shutter 135 is divided into four regions so as to correspond to the regions 131a, 131b, 131c, 131d of the light guide plate 131. When the FS regions are driven by the DDAM method, the optical shutter 135 is synchronized with the LED lamps 133 and selectively opened to thereby shut light leaked to a neighboring region if exists.

Hereinafter, a more detailed description will be made on the optical shutter 135, which is driven selectively and in synchronization with the LED lamps 133.

Figure 15:
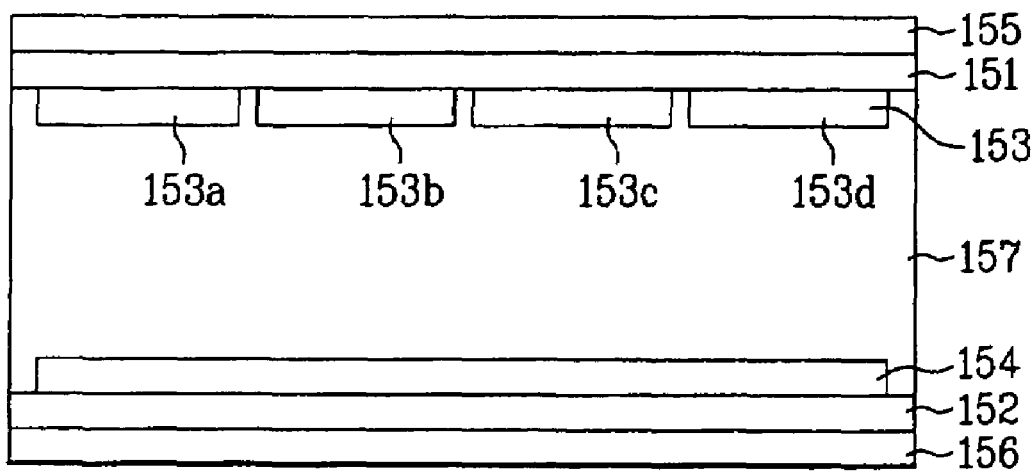
FIG. 15 is a sectional view of an optical shutter according to a fourth embodiment of the present invention.
Figure 16A:
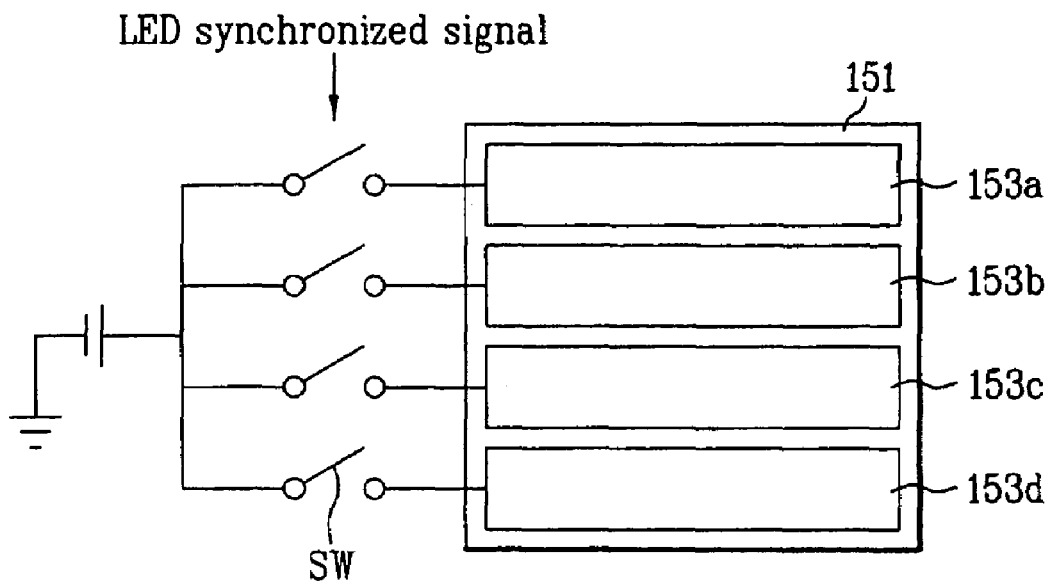
FIGS. 16A and 16B are upper and lower plan views of an optical shutter according to a fourth embodiment of the present invention.
Figure 16B:
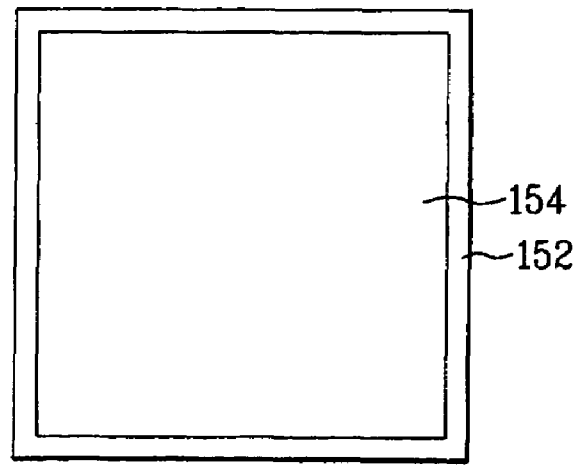
Figure 17:
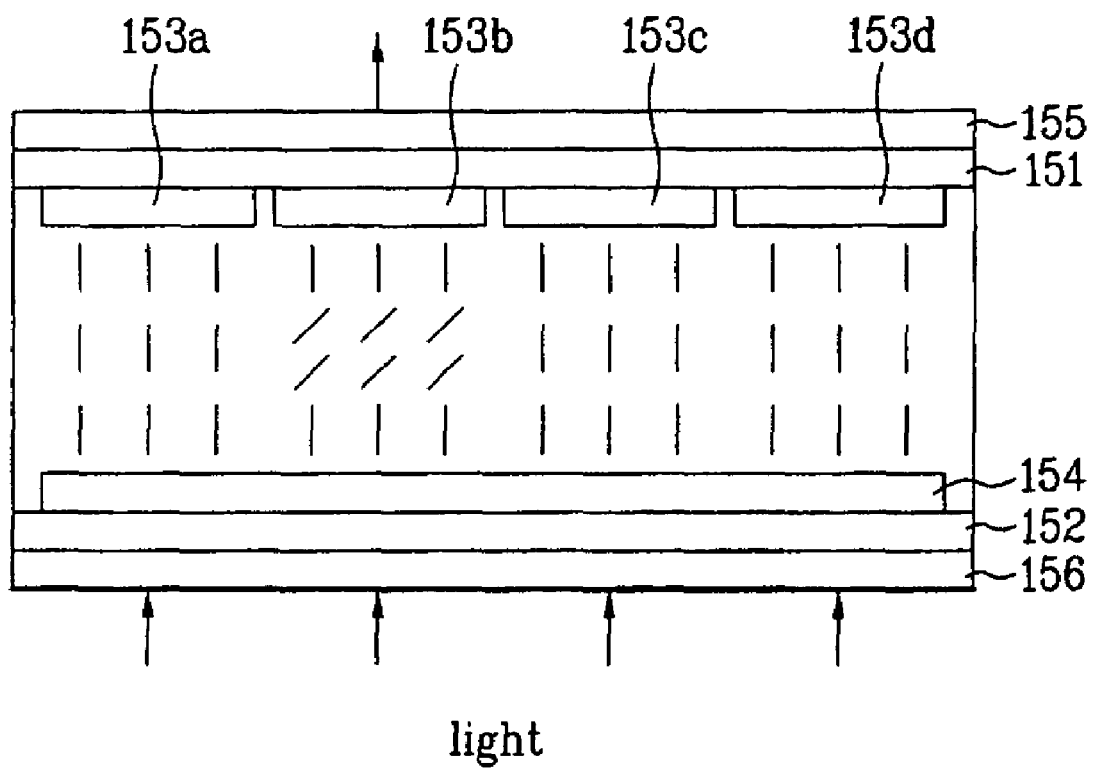
FIG. 17 is a sectional view illustrating a driving example of the optical shutter of FIG. 14.

FIG. 15 is a sectional view of the optical shutter 135 of FIG. 13, FIGS. 16A and 16B are upper and lower plan views of the optical shutter 135 of FIG. 13, and FIG. 17 illustrates an operation of the backlight unit using the optical shutter in FIG. 13.

The optical shutter 135 can be formed of a plastic LCD. For instance, as shown in FIGS. 15, 16A and 16B, the optical shutter 135 includes upper and lower plastic substrates 151 and 152 facing each other with a space therebetween, first and second transparent electrodes 153 and 154 respectively formed on the upper and lower plastic substrates 151 and 152, first and second polarizing plates 155 and 156 respectively arranged on rear sides of the upper and lower plastic substrates 151 and 152, and a liquid crystal layer 157 interposed between the upper plastic substrate 151 and the lower plastic substrate 152.

The first transparent electrode 153 of the upper plastic substrate 151 is divided into first to fourth regions 153a, 153b, 153c and 153d corresponding to the first to fourth regions 131a, 131b, 131c and 131d of the light guide plate 131. The first to fourth regions of the transparent electrode 153 are respectively connected with corresponding switches SW, which are sequentially opened by the respective synchronization signals of the LED lamps 133 (see FIG. 13). The opening of the switch SW means the opening of the corresponding region of the shutter 135, which permits transmission of light through the opened region of the shutter 135.

The second transparent electrode 154 on the lower plastic substrate 152 is formed on the entire surface of the lower plastic substrate 152 so as to function as a common electrode.

FIG. 17 illustrates an operation in which when the light of the LED lamps 133 is outputted to the second region 131b of the light guide plate 131, only the second region 131b of the optical shutter 135 corresponding to the second region 131b of the light guide plate 131 is opened and accordingly the light is outputted through only this opened second region.

The optical shutter shown in FIG. 17 is a VA mode LCD.

Thus, in the above example, since the optical shutter 135 is closed in other regions except for the second region, although light leakage occurs, the leaked light does not and cannot be outputted to the Liquid crystal panel.

Like the above, by using the optical shutter 135, which is synchronized with the LED lamps 133 and selectively opened, light leakage to a neighboring region other than the FS driven region can be prevented effectively.

According to a fifth embodiment of the invention, a backlight unit for a display device such as an LCD device includes an optical shutter arranged on the diffusion plate, and LED lamps arranged in a direct type.

Figure 18:
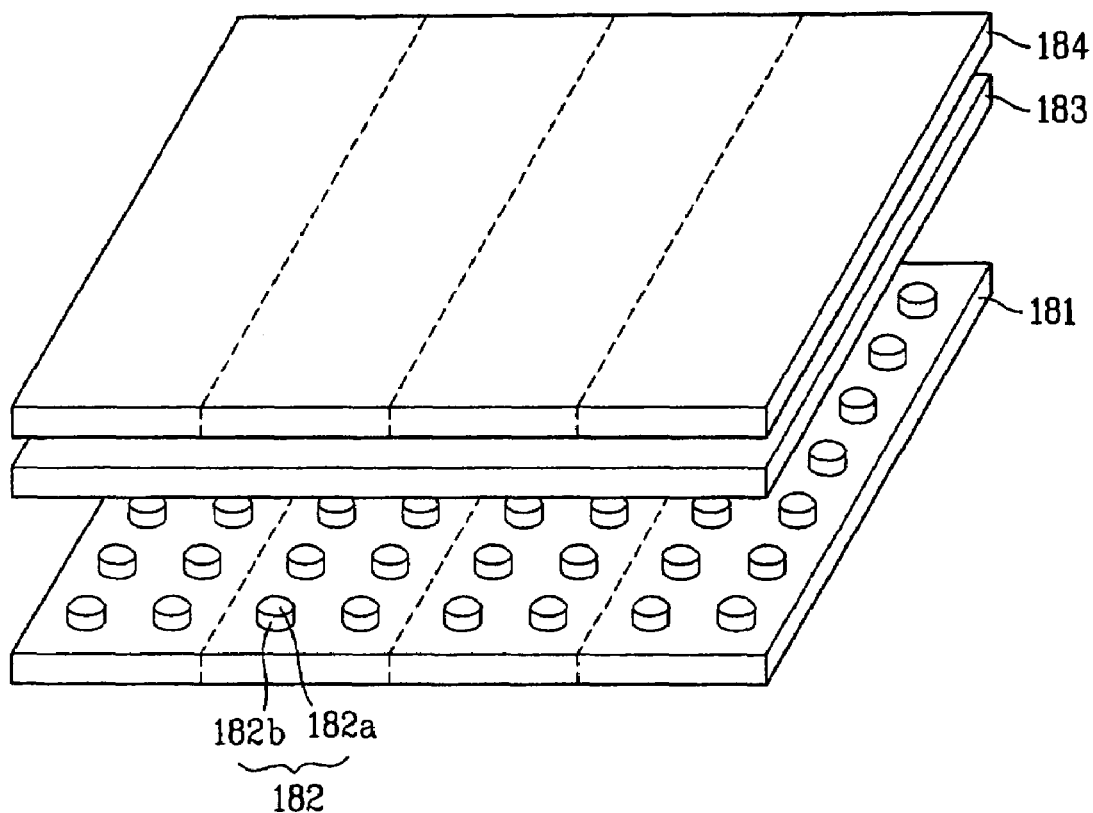
FIG. 18 is a perspective view of a backlight unit according to a fifth embodiment of the present invention.
Figure 19:
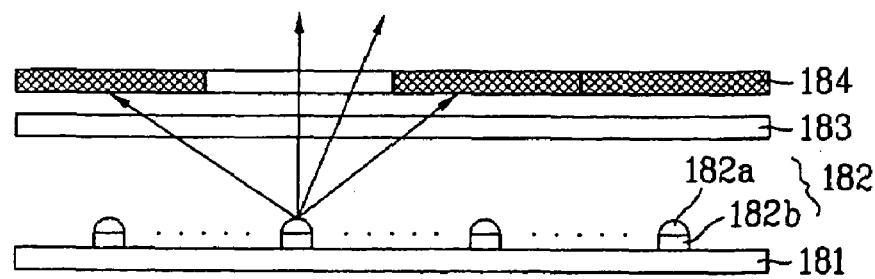
FIG. 19 illustrates structure and driving of a backlight unit according to a fifth embodiment of the present invention.

FIG. 18 is a perspective view of a backlight unit usable with or in a display device such as an LCD device according to the fifth embodiment of the present invention, and FIG. 19 illustrates a structure and driving of the backlight unit of FIG. 19.

In the invention, the display area can be divided into an n number of regions intentionally. In the below, as an example, a four division driving backlight unit in which the light guide plate is divided into four regions will be described.

As shown in FIGS. 18 and 19, the backlight unit according to the fifth embodiment of the present invention is configured to include a plurality of LED lamps 182 arranged on a PCB substrate 181, a diffusion plate 183 arranged on the LED lamps 182 for uniformly diffusing the light irradiated from the lamps 182, and an optical shutter 184 which is divided into four regions to be FS (field sequential) driven by a DDAM method and driven in synchronization with the LED lamps 182.

The LED lamps 182 are divided into four regions so as to correspond to the four regions of the optical shutter 184 and are driven selectively. Each of the LED lamps 182 includes a light emitting portion 182a and a body portion 182b.

The optical shutter 184 has the same construction as the optical shutter 135 of the fourth embodiment of the invention.

Thus, the aforementioned direct type LED backlight unit of FIGS. 18 and 19 is provided on the diffusion plate 183 with the optical shutter 184, where only the region of the shutter 183 corresponding to the driven LED lamps 182 may be opened at a time to thereby block light leaking to the neighboring region(s) of the shutter 184.

Hereinafter, a detailed description will be made on an LCD using the backlight unit constructed as above. As one example, FIG. 20 is a sectional view of an LCD device using a backlight unit of FIG. 8 according to the present invention.

Figure 20:
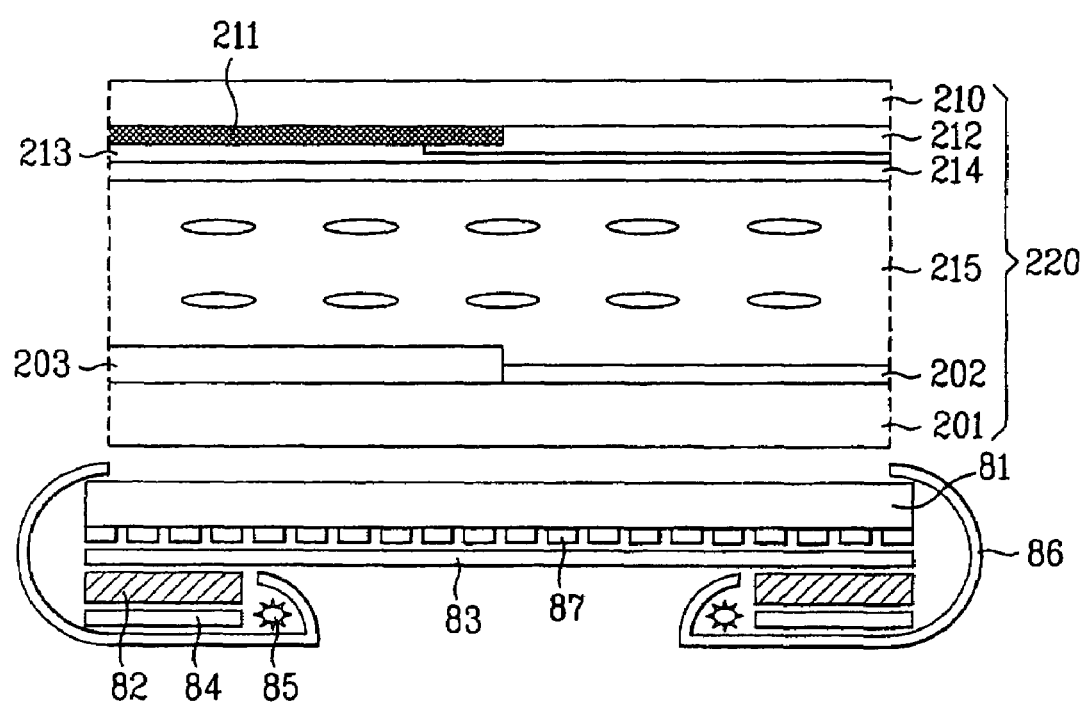
FIG. 20 is a sectional view of an LCD using a backlight unit according to the present invention.

As shown in FIG. 20, the LCD device using the backlight unit according to the present invention, is provided with a liquid crystal panel 220 including first and second transparent glass substrates 201 and 210 attached with each other with a predetermined space therebetween above the backlight unit (FIGS. 8A and 8B) according to the first embodiment, and a liquid crystal layer 215 interposed between the first glass substrate 201 and the second glass substrate 210.

On the first glass substrate 201 serving as a TFT array substrate, there are formed a plurality of gate lines arranged in one direction at a predetermined interval, a plurality of data lines arranged in a direction perpendicular to the gate lines at a predetermined interval, a plurality of pixel electrodes 202 arranged in a matrix configuration on pixel regions defined by the gate lines and the data lines perpendicularly crossing each other, and a plurality of thin film transistors (T) 203, which are switched by signals of the gate lines to transmit signals of the data lines to the respective corresponding pixel electrodes.

On the second glass substrate 210 serving as a color filter substrate, there are formed a black matrix layer 211 for shutting light of portions except for the pixel regions, a color filter layer 212 having R (Red), G (Green) and B (Blue) cells which transmit only light of a specific wavelength band and absorb light of the remaining wavelength band, and a common electrode 214 for realizing an image. Reference numeral 213 represents an overcoat layer.

The first and second glass substrates 201 and 210 are attached to each other by sealant while maintaining a predetermined space between the substrates 201 and 210 due to the existence of spacers. Liquid crystal is injected into the space between the first and second glass substrates 201 and 210.

For the convenience of description, only a unit pixel region is shown in the first and second glass substrates 201 and 210 of FIG. 20.

Although not shown in the drawings, the aforementioned Liquid crystal panel 220 can be provided above each of the backlight units (as shown in FIGS. 9, 11, 13 and 18) according to the second to fifth embodiments.

The aforementioned embodiments of the present invention can be used as a light source at the rears or fronts of a variety of display devices including LCD devices, and each of the embodiments can be used as a light emitting device.

The aforementioned backlight unit of the display device and the LCD device using the backlight unit have the following advantages.

First, the lamp housing is constructed concave to minimize the reflection angle of light reflected by the lamp housing, so that light leakage to a neighboring region (or non-driven region of the display device) can be prevented in a DDAM driving.

Second, since the light guide plate is divided into a plurality of regions at a predetermined interval, light leakage to a neighboring region can be prevented to thereby enhance the display performances.

Third, since two sheets of light guide plates are arranged in a stack structure and LED lamps are dispersedly arranged, light leakage to a neighboring region can be prevented in a DDAM driving.

Fourth, since an optical shutter, which is driven in synchronization with the LED lamps of a backlight unit is provided, light leakage to a neighboring region can be prevented to thereby enhance the display performance.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A backlight unit for a display device, comprising:
   a main light guide plate defined into an n number of regions for a field sequential driving;
   a plurality of auxiliary light guide plates arranged below edge portions of the main light guide plate;
   first and second reflection plates arranged below the main light guide plate and the auxiliary light guide plates;
   a plurality of light source parts arranged at a predetermined interval at sides of the auxiliary light guide plates; and
   a housing configured to enclose at least parts of the main light guide plate, the auxiliary light guide plates and the light source parts.

2. The backlight unit of claim 1, wherein the main light guide plate comprises a plurality of dot patterns formed on a lower surface of the man light guide late.

3. The backlight unit of claim 1, wherein the housing is constructed concave at side portions of the main light guide plate and the auxiliary light guide plates.

4. The backlight unit of claim 1, wherein each of the auxiliary light guide plates has a width smaller than the main light guide plate and is arranged in one direction.

5. The backlight unit of claim 1, wherein the light source part is an LED lamp having R (Red), G (Green) and B (Blue) light sources.

6. The backlight unit of claim 1, wherein the housing encompasses sides of the main light guide plate, sides and bottom of the auxiliary guide plates, and the light source parts.

7. A backlight unit for a display device, comprising:
   first to n-th light guide plates corresponding to an n number of regions for a field sequential driving;
   a reflection plate arranged below the first to n-th light guide plates;
   a plurality of light source parts arranged at a predetermined interval at both sides of the first to n-th light guide plates; and
   a PCB substrate provided with the light source parts arranged at both sides of the first to n-th light guide plates.

8. The backlight unit of claim 7, wherein each of the light source parts comprises a light emitting portion and a body portion respectively arranged on the PCB substrate.

9. The backlight unit of claim 7, wherein the first to n-th light guide plates comprise lower surfaces provided with a plurality of dot patterns.

10. The backlight unit of claim 7, wherein the light source parts include LED lamps having R (Red), G (Green) and B (Blue) light sources.

11. A backlight unit for a display device, comprising:
    upper and lower light guide plates each divided into first to n-th regions for a field sequential driving;
    a plurality of light sources arranged in a zigzag configuration at sides of the first to n-th regions of the upper and lower light guide plates;
    a first reflection plate arranged below the lower light guide plate; and
    at least one second reflection plate each positioned below one of the first to n-th regions of the upper light guide plate, adjacent to which the light sources are arranged.

12. The backlight unit of claim 11, further comprising:
    a PCB substrate supporting the light sources.

13. The backlight unit of claim 12, wherein each of the light sources comprises a light emitting portion and a body portion respectively arranged on the PCB substrate.

14. The backlight unit of claim 11, wherein the upper and lower light guide plates comprise lower surfaces provided with a plurality of dot patterns.

15. The backlight unit of claim 14, wherein the dot patterns are provided only on certain regions of each of the upper and lower light guide plates, adjacent to which the light sources are arranged.

16. The backlight unit of claim 11, wherein when each of the upper and lower light guide plates is divided into first to fourth regions to be four division-driven by a divided display area method, the light sources are arranged at both sides of the first and third regions of the upper light guide plate and at both sides of the second and fourth regions of the lower light guide plate.

17. The backlight unit of claim 11, wherein the light sources are LED lamps having R (Red), G (Green), and B (Blue) colors.

18. A backlight unit for a display device, comprising:
a light guide plate divided into an n number of regions for a field sequential driving;
a reflection plate arranged below the light guide plate;
a plurality of light sources arranged at a predetermined interval at sides of the light guide plate;
a PCB substrate supporting the light sources; and
an optical shutter arranged above the light guide plate and driven in synchronization with an operation of the light sources.

19. The backlight unit of claim 18, wherein each of the light sources comprises a light emitting portion and a body portion respectively arranged on the PCB substrate.

20. The backlight unit of claim 18, wherein the light guide plate comprises a lower surface provided with a plurality of dot patterns.

21. The backlight unit of claim 18, wherein the optical shutter is divided into an n number of regions corresponding to the n number of regions of the light guide plate.

22. The backlight unit of claim 18, wherein the optical shutter comprises:
upper and lower plastic substrates facing each other with a predetermined interval therebetween;
first and second transparent electrodes respectively arranged on the upper and lower plastic substrates;
first and second polarizing plates respectively arranged on rear sides of the upper and lower plastic substrates; and
a liquid crystal layer interposed between the upper and lower plastic substrates.

23. The backlight unit of claim 22, wherein the first transparent electrode of the upper plastic substrate is divided into first to n-th regions, and the divided first to n-th regions are connected with a switching part so as to be sequentially opened.

24. The backlight unit of claim 22, wherein the second transparent electrode is formed on a front side of the lower plastic substrate.

25. The backlight unit of claim 18, wherein the light sources are LED lamps.

26. A backlight unit for a display device, comprising:
a plurality of light sources arranged on a substrate located directly below the display device;
a diffusion plate arranged above the light sources, for uniformly diffusing light irradiated from the light sources; and
an optical shutter divided into an n number of regions for a field sequential driving;
means for field sequentially driving the light sources; and
switch means for driving the optical shutter in synchronization with the light sources, the optical shutter being over the diffusion plate.

27. The backlight unit of claim 26, wherein each of the light sources comprises a light emitting portion and a body portion disposed on a PCB substrate.

28. The backlight unit of claim 26, wherein the light sources are LED lamps.

29. A liquid crystal display device using a backlight unit, the liquid crystal display device comprising:
(a) the backlight unit including: a main light guide plate defined by an n number of regions for a field sequential driving; a plurality of auxiliary light guide plates arranged below edge portions of the main light guide plate; first and second reflection plates arranged below the main light guide plate and the auxiliary light guide plates; a plurality of light source parts arranged at a predetermined interval at sides of the auxiliary light guide plates; and a housing configured to enclose at least parts of the main light guide plate, the auxiliary light guide plates and the light source parts; and
(b) a liquid crystal panel above the backlight unit.

30. The liquid crystal display device of claim 29, wherein the light liquid crystal panel includes first and second glass substrates attached to each other with a space therebetween, and a liquid crystal layer interposed between the first and second glass substrates.

31. A liquid crystal display device using a backlight unit, the liquid crystal display device comprising:
(a) the backlight unit including: first to n-th light guide plates corresponding to an n number of regions for a field sequential driving; a reflection plate arranged below the first to n-th light guide plates; a plurality of light source parts arranged at a predetermined interval at both sides of the first to n-th light guide plates; and a PCB substrate in which the light source parts are arranged at both sides of the first to n-th light guide plates; and
(b) a liquid crystal panel above the backlight unit.

32. The liquid crystal display device of claim 31, wherein the liquid crystal panel includes first and second glass substrates attached to each other with a space therebetween, and a liquid crystal layer interposed between the first and second glass substrates.

33. A liquid crystal display device using a backlight unit, the liquid crystal display device comprising:
(a) the backlight unit including: upper and lower light guide plates each divided into first to n-th regions for a field sequential driving; a plurality of light sources arranged in a zigzag configuration at sides of the first to n-th regions of the upper and lower light guide plates; a first reflection plate arranged below the lower light guide plate; and at least one second reflection plate each positioned below one of the first to n-th regions of the upper light guide plate, adjacent to which the light sources are arranged; and
(b) a liquid crystal panel above the backlight unit.

34. The liquid crystal display device of claim 33, wherein the liquid crystal panel includes first and second glass substrates attached to each other with a space therebetween, and a liquid crystal layer interposed between the first and second glass substrates.

35. A liquid crystal display device using a backlight unit, the liquid crystal display device comprising:
(a) the backlight unit including: a light guide plate divided into an n number of regions for a field sequential driving; a reflection plate arranged below the light guide plate; a plurality of light sources arranged at a predetermined interval at sides of the light guide plate; a PCB substrate supporting the light sources; and an optical shutter arranged above the light guide plate and driven in synchronization with an operation of the light sources; and (b) a liquid crystal panel above the backlight unit.

36. The liquid crystal display device of claim 35, wherein the liquid crystal panel includes first and second glass substrates attached to each other with a space therebetween, and a liquid crystal layer interposed between the first and second glass substrates.

37. A liquid crystal display device using a backlight unit, the liquid crystal display device comprising:
(a) the backlight unit including: a plurality of light sources arranged on a substrate located directly below the liquid crystal display device; a diffusion plate arranged directly above the light sources, for uniformly diffusing light irradiated from the light sources; and an optical shutter divided into an n number of regions for a field sequential driving and driven in synchronization with the light sources, the optical shutter being over the diffusion plate; and (b) a liquid crystal panel above the backlight unit.

38. A liquid crystal display device using a backlight unit, the liquid crystal display device comprising: (a) the backlight unit including: a plurality of light sources arranged on a substrate; a diffusion plate arranged above the light sources, for uniformly diffusing light irradiated from the light sources; and an optical shutter divided into an n number of regions for a field sequential driving and driven in synchronization with the light sources;

(b) a liquid crystal panel above the backlight unit; and wherein the liquid crystal panel includes first and second glass substrates attached to each other with a space therebetween, and a liquid crystal layer interposed between the first and second glass substrates.

* * * * *